US011118918B2

(12) United States Patent
Abramson

(10) Patent No.: US 11,118,918 B2
(45) Date of Patent: Sep. 14, 2021

(54) ENHANCED NAVIGATION INSTRUCTION

(71) Applicant: Cellepathy Inc.

(72) Inventor: Dan Abramson, Fall City, WA (US)

(73) Assignee: Cellepathy Inc., Fall City, WA (US)

(*) Notice: Subject to any disclaimer, the term of this patent is extended or adjusted under 35 U.S.C. 154(b) by 0 days.

(21) Appl. No.: 16/237,641

(22) Filed: Dec. 31, 2018

(65) Prior Publication Data
US 2019/0376798 A1 Dec. 12, 2019

Related U.S. Application Data

(60) Provisional application No. 62/612,577, filed on Dec. 31, 2017.

(51) Int. Cl.
*G01C 21/34* (2006.01)
*G01C 21/36* (2006.01)

(52) U.S. Cl.
CPC ..... *G01C 21/3415* (2013.01); *G01C 21/3484* (2013.01); *G01C 21/3626* (2013.01)

(58) Field of Classification Search
CPC ............ G01C 21/3484; G01C 21/3415; G01C 21/3636
See application file for complete search history.

(56) References Cited

U.S. PATENT DOCUMENTS

| 2009/0005082 | A1* | 1/2009 | Forstall | G01C 21/3453 |
| | | | | 455/456.5 |
| 2009/0005964 | A1* | 1/2009 | Forstall | G01C 21/3492 |
| | | | | 701/533 |
| 2014/0309864 | A1* | 10/2014 | Ricci | G05D 23/1917 |
| | | | | 701/36 |
| 2015/0168174 | A1* | 6/2015 | Abramson | G01C 21/3626 |
| | | | | 701/408 |
| 2016/0205238 | A1* | 7/2016 | Abramson | G01C 21/3641 |
| | | | | 455/456.4 |
| 2016/0216130 | A1* | 7/2016 | Abramson | G01C 21/3423 |
| 2017/0279957 | A1* | 9/2017 | Abramson et al. | H04M 1/6075 |

* cited by examiner

*Primary Examiner* — Peter D Nolan
*Assistant Examiner* — Demetra R Smith-Stewart
(74) *Attorney, Agent, or Firm* — FisherBroyles, LLP; Ariel Reinitz

(57) ABSTRACT

Systems, methods, and technologies are provided for enhanced navigation instruction. In one implementation, a first input is received with respect to a device. The first input is processed to determine a navigation initiation instance with respect to the device. Based on the navigation initiation instance, a navigation destination is identified. Based on the identified navigation destination, a navigation route associated with the device is identified. An alternative route is computed based on a current location of the device and the identified navigation destination. The identified navigation route is compared with the computed alternative route. The alternative route is identified as preferable to the identified navigation route with respect to one or more criteria and above a defined threshold. A degree of familiarity of a user with the alternative route is determined. Notifications are generated based on the determined degree of familiarity. The notifications are provided via interface(s) of the device.

20 Claims, 15 Drawing Sheets

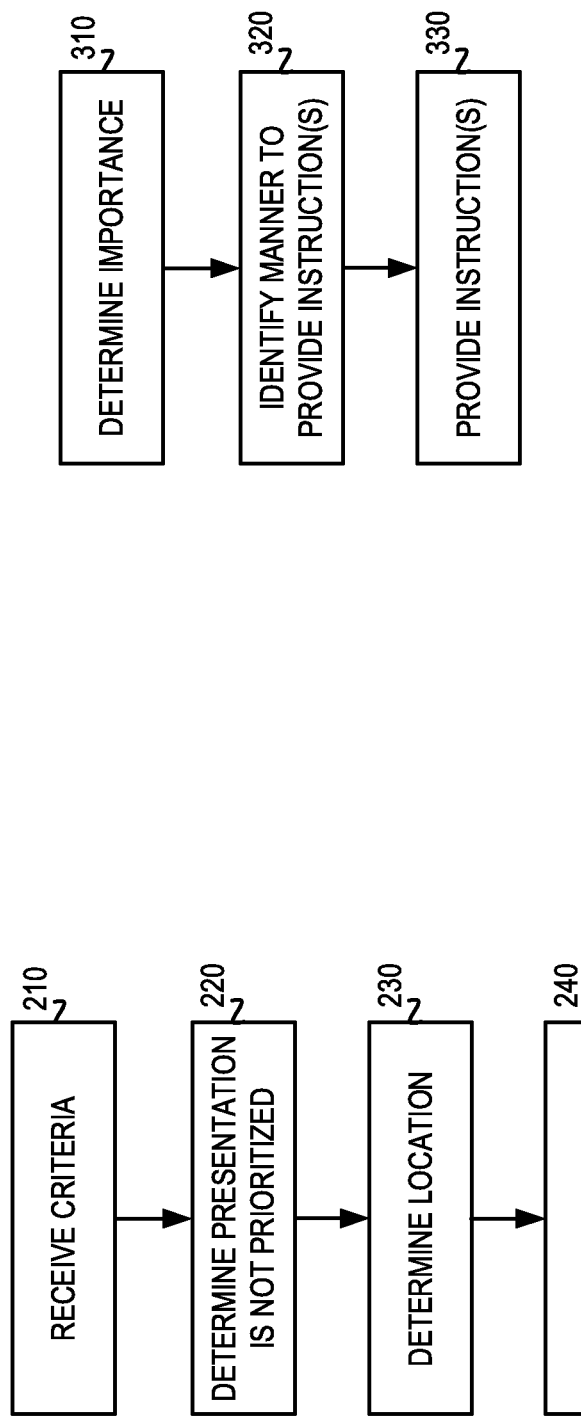

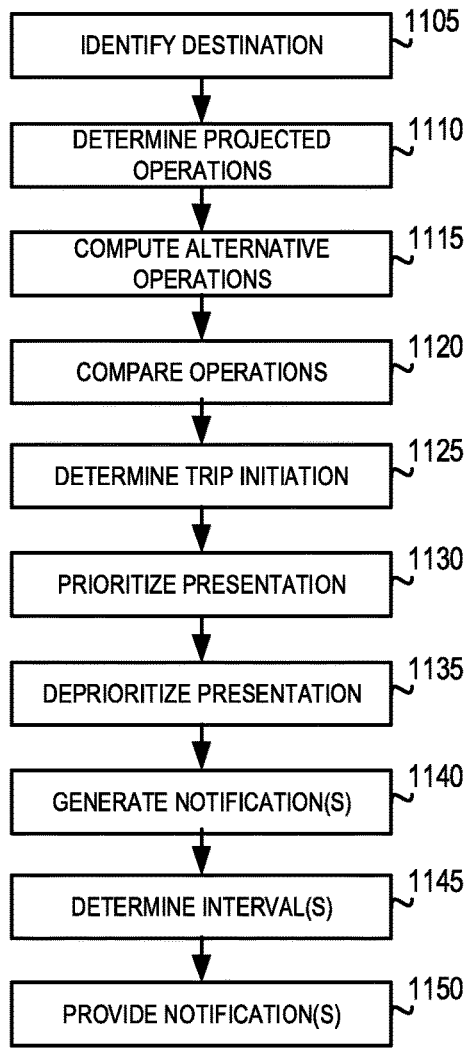
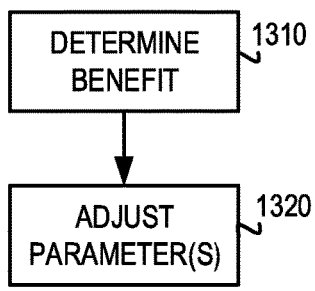
FIG. 4
FIG. 6
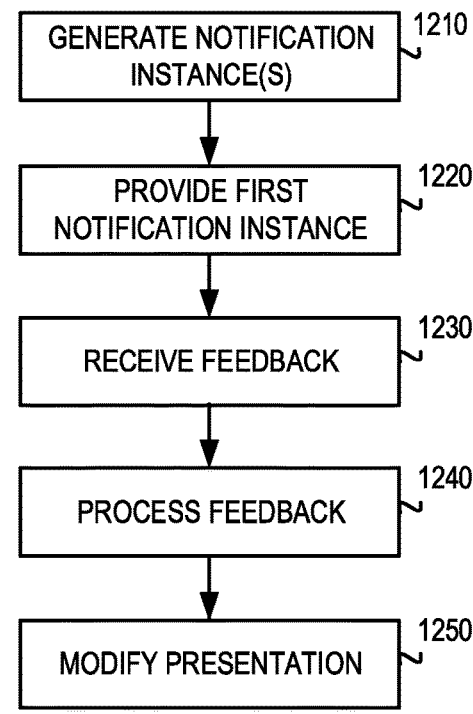
FIG. 5
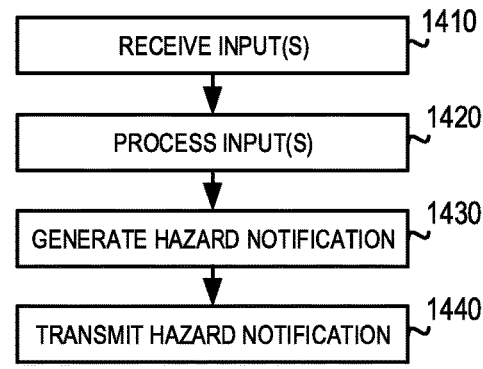
FIG. 7

ENHANCED NAVIGATION INSTRUCTION

CROSS-REFERENCE TO RELATED APPLICATIONS

This application is related to and claims the benefit of priority to U.S. Patent Application No. 62/612,577, filed Dec. 31, 2017, which is incorporated herein by reference in its entirety.

TECHNICAL FIELD

Aspects and implementations of the present disclosure relate to data processing and, more specifically, but without limitation, to enhanced navigation instruction.

BACKGROUND

Mobile devices such as smartphones enable users to utilize navigation applications while traveling. Such navigation applications can provide instructions, such as turn-by-turn navigation instructions that are provided while a user of the device is driving. While the use of mobile devices in transportation contexts can be beneficial, operation of such devices by a user while driving can distract the user and compromise the safety of the user as well as others on the road.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

FIGS. 2-8 are flow charts illustrating methods for enhanced navigation instruction, in accordance with example embodiments.

DETAILED DESCRIPTION

Figure 1:
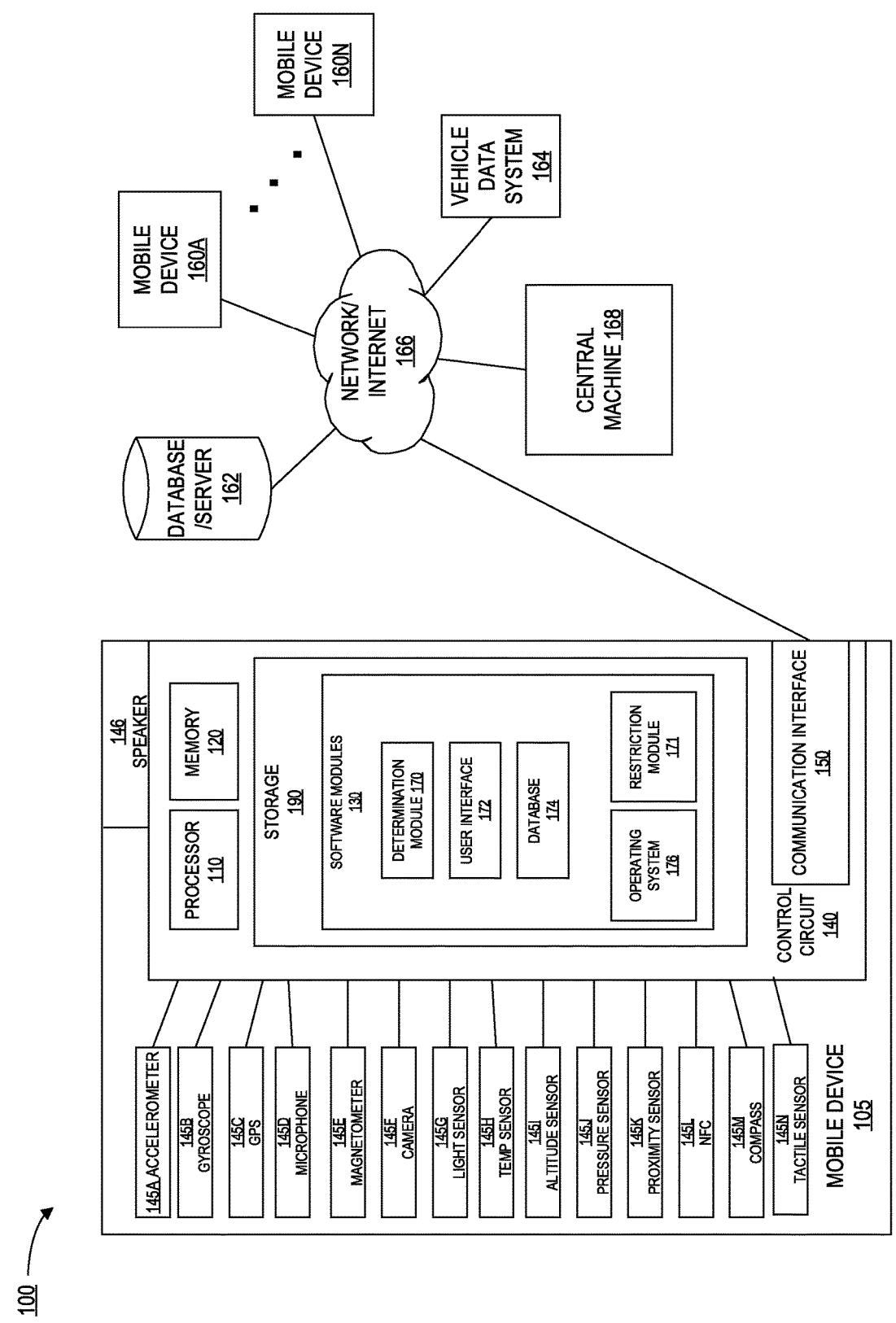
FIG. 1 illustrates an example system, in accordance with an example embodiment.

Aspects and implementations of the present disclosure are directed to enhanced navigation instruction and user determination.

As will be described in detail herein, many identifications and/or determinations are made possible through various sensors, components, and elements that are integrated within and/or accessible to a mobile device. Devices such as smartphones incorporate multiple sensors, including accelerometers, GPS receivers, and gyroscopes. Various inputs and/or notifications can be received from these sensors, components, and elements, and can further be processed in a number of ways in order to compute various determinations such as those regarding, among others, the user of the mobile device (such as whether the user is a driver or passenger in a car) and/or the status of the mobile device itself, and various probabilities can be ascribed to the conclusions. The operation of the mobile device can further be adjusted based on such determinations, for example, disabling or limiting the operation of a mobile device upon determining that the device is being operated by a user who is driving a car. Additionally, in certain implementations the described technologies can also generate and provide improved/enhanced navigation instructions, verify an identity of a user, as well as various other features and functions, such as is described herein.

It will also be appreciated that the systems and methods disclosed herein can be arranged and/or deployed across a number of scenarios. In one scenario, the systems and methods can be principally employed at a mobile device itself, such as in the form of a mobile application or 'app' executing on the mobile device. In other scenarios, a central machine such as a server in communication with a mobile device can employ the present systems and methods. Such a centralized architecture can enable efficient processing and use of a larger database of user determination characteristics, eliminates power constraints and enables third parties, such as law-enforcement agencies and/or insurance companies, to easily monitor and/or adjust the operation of various mobile devices.

The following detailed description is directed to various systems, methods, and machine-readable mediums, such as those directed towards enhanced navigation instruction, user determination, and/or various other operations. The referenced systems and methods are now described more fully with reference to the accompanying drawings, in which one or more illustrated embodiments and/or arrangements of the systems and methods are shown. The systems and methods are not limited in any way to the illustrated embodiments and/or arrangements as the illustrated embodiments and/or arrangements described below are merely exemplary of the systems and methods, which can be embodied in various forms. Therefore, it is to be understood that any structural and functional details disclosed herein are not to be interpreted as limiting the systems and methods, but rather are provided as a representative embodiment and/or arrangement for teaching one skilled in the art one or more ways to implement the systems and methods. Furthermore, the terms and phrases used herein are not intended to be limiting, but rather are to provide an understandable description of the systems and methods.

The terms "operation state" and "operation states" as used herein are intended to encompass the states of a device, including any and all operations, functions, capacities, and/or capabilities, including, explicitly, a set and/or series of any number of operations, functions, capacities, and/or capabilities, that can be achieved by and/or in conjunction with a device, such as a mobile device. Examples of an operation state include but are not limited to: an execution of an application (such as an internet browser application) at a mobile device, a transmission of a notification (such as sending a text message or email message), a capacity to receive text messages, and a capability to type text using a keyboard. Accordingly, the various transformations, adjustments, and/or modifications disclosed herein that relate to an operation state and/or operation states should be understood to refer to such transformations, adjustments, and/or modifications that pertain to practically any and all operations, functions, capacities, and/or capabilities that can be achieved by and/or in conjunction with a device, such as a mobile device.

The terms "user" and "users" as used herein are intended to encompass one or more individuals, persons, and/or entities whose presence a device or machine can preferably be directly or indirectly aware. It should be understood that while in certain scenarios a user can interact with a device, in other scenarios a particular individual, person, and/or entity can be said to be a "user" within the context of the present disclosure, despite not interacting with a particular device.

The terms "tactile sensor" and "tactile sensor(s)" as used herein are intended to encompass one or more buttons, touchscreens, and/or components that enable a user to interact with a device in a tactile fashion. Examples of such tactile sensors include, but are not limited to, buttons (such as those that comprise a keyboard), switches, as well as touch screen displays (such as capacitive and resistive displays) which both display information and allow the tactile interaction with such information. It should be further understood that such tactile sensors are preferably further capable of perceiving a plurality of simultaneous tactile interactions. Examples of such functionality include multi-touch technologies, as are known to those of ordinary skill in the art.

The terms "visual capture" and "visual captures" as used herein are intended to encompass one or more operations, functions, and/or actions that relate to the optical perception and/or documentation of one or more visual items, elements, and/or phenomena. Examples of such visual captures include, but are not limited to, photographs, images, videos, and/or any other such method of visual perception and/or documentation. Accordingly, it can be appreciated that certain visual captures correspond to a single instance (such as a photograph) while other visual captures correspond to multiple instances (such as a series of photographs and/or a video).

The term "in-vehicle role indicator" as used herein is intended to encompass one or more items, elements, and/or indicators that relate to one or more aspects associated with and/or corresponding to the in-vehicle role of a user in a vehicle (e.g., whether a user is or is not a driver, is or is not a passenger, etc.). For example, one such in-vehicle role indicator is identifying in a picture of two hands of a driver grasping the steering wheel of a vehicle. Using one or more optical recognition methods, such as those known to one of ordinary skill in the art, one or more images and/or videos can be processed in order to identify the presence of two hands grasping a steering wheel, thus indicating that a particular vehicle is being operated by a driver using two hands and therefore it can be reasonable concluded that the user who took such an image is not the driver. By way of further example, another such in-vehicle role indicator can be capturing a picture that can be processed to identify that a seatbelt extends from the right shoulder to left thigh of the wearer. Such an identification also reasonably suggests that the wearer is not a driver (as the seatbelt of a driver traditionally extends from the left shoulder to the right thigh).

It should be further understood that while the various computing devices and machines referenced herein, including but not limited to the first mobile device, the second mobile device, the central machine, or any other such similar or related devices or machines are referred to herein in a as individual/single devices and/or machines, in certain arrangements the referenced devices and machines, and their associated and/or accompanying operations, features, and/or functionalities can be arranged or otherwise employed across any number of devices and/or machines, such as over a network connection, as is known to those of skill in the art.

In addition, it should be understood that while the term "input" is used herein in the singular form, this is merely for the sake of clarity and convention. However, the referenced terms should be understood to encompass both singular inputs as well as a plurality (two or more) inputs, such as a set of inputs.

An exemplary computer system is shown as a block diagram in FIG. 1 which is a high-level diagram illustrating an exemplary configuration of a determination system 100. In one arrangement, mobile device 105 can be a portable computing device such as a mobile phone, smartphone, or PDA. In other arrangements, mobile device 105 can be a tablet computer, a laptop computer, a personal computer, or an in-vehicle computer (e.g., ECU/OBD) though it should be understood that mobile device 105 of determination system 100 can be practically any computing device capable of embodying the systems and/or methods described herein (e.g., a wearable device, smartwatch, etc.).

Mobile device 105 of determination system 100 includes a control circuit 140 (e.g., a motherboard) which is operatively connected to various hardware and software components that serve to enable operation of the determination system 100. The control circuit 140 is operatively connected to a processor 110 and a memory 120. Processor 110 serves to execute instructions for software that can be loaded into memory 120. Processor 110 can be a number of processors, a multi-processor core, or some other type of processor, depending on the particular implementation. Further, processor 110 can be implemented using a number of heterogeneous processor systems in which a main processor is present with secondary processors on a single chip. As another illustrative example, processor 110 can be a symmetric multi-processor system containing multiple processors of the same type.

Memory 120 and/or storage 190 are accessible by processor 110, thereby enabling processor 110 to receive and execute instructions stored on memory 120 and/or on storage 190. Memory 120 can be, for example, a random access memory (RAM) or any other suitable volatile or non-volatile computer readable storage medium. In addition, memory 120 can be fixed or removable. Storage 190 can take various forms, depending on the particular implementation. For example, storage 190 can contain one or more components or devices. For example, storage 190 can be a hard drive, a flash memory, a rewritable optical disk, a rewritable magnetic tape, or some combination of the above. Storage 190 also can be fixed or removable.

One or more software modules 130 are encoded in storage 190 and/or in memory 120. The software modules 130 can comprise one or more software programs or applications having computer program code or a set of instructions executed in processor 110. Such computer program code or instructions for carrying out operations for aspects of the systems and methods disclosed herein can be written in any combination of one or more programming languages, including an object-oriented programming language such as Java, Smalltalk, C++ or the like and conventional procedural programming languages, such as the "C" programming language or similar programming languages. The program code can execute entirely on the mobile device 105, partly on mobile device 105, as a stand-alone software package, partly on mobile device 105 and partly on a remote computer/device or entirely on the remote computer/device or server. In the latter scenario, the remote computer can be connected to mobile device 105 through any type of network, including a local area network (LAN) or a wide area network (WAN), or the connection can be made to an external computer (for example, through the Internet using an Internet Service Provider). Software modules 130, including program code/instructions, are located in a functional form on one or more computer readable storage devices (such as memory 120 and/or storage 190) that can be selectively removable. The software modules 130 can be loaded onto or transferred to mobile 105 for execution by processor 110. It can also be said that the program code of software modules 130 and one or more computer readable storage devices (such as memory 120 and/or storage 190) form a computer program product. It should be understood that in some illustrative embodiments, one or more of software modules 130 can be downloaded over a network to storage 190 from another device or system via communication interface 150 for use within determination system 100. For instance, program code stored in a computer readable storage device in a server can be downloaded over a network from the server to determination system 100.

Software modules 130 can include a determination module 170 that is executed by processor 110. During execution of the software modules 130 (e.g., determination module 170) the processor 110 configures the control circuit 140 to determine an in-vehicle role of a user of the mobile device 105, and/or compute one or more other determinations and/or imitated one or more other actions, as will be described in greater detail below. It should be understood that while software modules 130 and/or determination module 170 can be embodied in any number of computer executable formats, preferably software modules 130 and/or determination module 170 comprise one or more applications or 'apps' that are configured to be executed at mobile device 105 and/or in relation to mobile device 105. In other arrangements, software modules 130 and/or determination module 170 are incorporated and/or integrated within operating system 176. Furthermore, in certain arrangements, software modules 130 and/or determination module 170 can be configured to execute at the request or selection of a user of mobile device 105 (or any other such user having the ability to execute a program in relation to mobile device 105, such as a network administrator), while in other arrangements mobile device 105 can be configured to automatically execute software modules 130 and/or determination module 170, without requiring an affirmative request to execute. The advantages of such an automatic arrangement can be appreciated in context of a regulatory scheme that mandates or recommends that software modules 130 and/or determination module 170 be executed by a mobile device 105 some or all of the time, in furtherance of a campaign to improve driver safety. It should also be noted that while FIG. 1 depicts memory 120 oriented on control circuit 140, in an alternate arrangement, memory 120 can be operatively connected to the control circuit 140. In addition, it should be noted that other software modules (such as user interface 172 and operating system 176) and other information and/or data relevant to the operation of the present systems and methods (such as database 174) can also be stored on storage 190, as will be discussed in greater detail below.

A communication interface 150 is also operatively connected to control circuit 140. Communication interface 150 can be any interface that enables communication between the mobile device 105 and external devices, machines and/or elements. Preferably, communication interface 150 includes, but is not limited to, a modem, a Network Interface Card (NIC), an integrated network interface, a radio frequency transmitter/receiver (e.g., Bluetooth, cellular, NFC), a satellite communication transmitter/receiver, an infrared port, a USB connection, or any other such interfaces for connecting mobile device 105 to other computing devices and/or communication networks such as the Internet. Such connections can include a wired connection or a wireless connection (e.g. 802.11) though it should be understood that communication interface 150 can be practically any interface that enables communication to/from the control circuit 140.

At various points during the operation of determination system 100, mobile device 105 can communicate with one or more mobile devices 160A-N (collectively mobile devices 160). The mobile devices 160 transmit and/or receive data to/from the mobile device 105, thereby preferably enhancing the operation of the determination system 100, as will be described in greater detail below. It should be understood that mobile devices 160 can be in direct communication with mobile device 105, indirect communication with mobile device 105, and/or can be communicatively coordinated with mobile device 105, as will be described in greater detail below. While mobile device 160 can be practically any device capable of communication with mobile machine 105, in the preferred embodiment mobile device 160 is a handheld/portable computer, smartphone, personal digital assistant (PDA), tablet computer, and/or any portable device that is capable of transmitting and receiving data to/from mobile device 105. It should also be appreciated that in many arrangements, mobile device 160 will be substantially identical, from a structural and functional perspective, to mobile device 105. It should also be noted that while FIG. 1 depicts the determination system 100 with respect to mobile device 160A and mobile device 160N, it should be understood that any number of mobile devices 160 can interact with determination system 100 in the manner described herein.

Also connected to and/or in communication with control circuit 140 are one or more sensors 145A-145N (generically sensors 145). Sensors 145 can be various components, devices, and/or receivers that are preferably incorporated within and/or in communication with mobile device 105. Sensors 145 preferably detect one or more stimuli, phenomena, or any other such inputs, as will be described in greater detail below. Examples of such sensors 145 include, but are not limited to, an accelerometer 145A, a gyroscope 145B, a GPS receiver 145C, a microphone 145D, a magnetometer 145E, a camera 145F, a light sensor 145G, a temperature sensor 145H, an altitude sensor 145I, a pressure sensor 145J, a proximity sensor 145K, a near-field communication (NFC) device 145L, a compass 145M, and a tactile sensor 145N. As will be described in greater detail below, mobile device 105 can preferably receive one or more inputs from one or more sensors 145, e.g., in order to compute various determinations, initiate one or more operations, etc.

In certain arrangements, one or more external databases and/or servers 162 are also in communication with mobile device 105. As will be described in greater detail below, database/server 162 can be a computing and/or storage device, and/or a plurality of computing and/or storage devices, that contain(s) information that can be relevant to various determinations/operations described herein. Additionally, in certain arrangements a vehicle data system 164, such as an on-board diagnostic (OBD) computer or computing device (e.g., OBD-I, OBD-II), an engine control unit (ECU), a roll system, an airbag system, a seat-weight sensor system, a seat-belt sensor system, and/or an anti-lock braking system (ABS) can also be in communication with mobile device 105. Vehicle data system 164 preferably provides data and/or information from the vehicle itself that can also be relevant to various determinations disclosed herein.

At this juncture, it should be noted that in certain arrangements, such as the one depicted in FIG. 1, mobile devices 160, database/server 162, and/or vehicle data system 164 can be in periodic or ongoing communication with mobile device 105 thorough a computer network such as the Internet 166. Although not depicted in FIG. 1, it should be understood that in certain other arrangements, mobile devices 160, database/server 162, and/or vehicle data system 164 can be in periodic or ongoing direct communication with mobile device 105, such as through communications interface 150, thus not requiring the presence of a network (such as the Internet 166) in order to initiate and maintain communications.

In the description that follows, certain embodiments and/or arrangements are described with reference to acts and symbolic representations of operations that are performed by one or more devices, such as the determination system 100 of FIG. 1. As such, it will be understood that such acts and operations, which are at times referred to as being computer-executed, include the manipulation by the processor of the computer of electrical signals representing data in a structured form. This manipulation transforms the data and/or maintains them at locations in the memory system of the computer, which reconfigures and/or otherwise alters the operation of the computer in a manner understood by those skilled in the art. The data structures in which data is maintained are physical locations of the memory that have particular properties defined by the format of the data. However, while an embodiment is being described in the foregoing context, it is not meant to provide architectural limitations to the manner in which different embodiments can be implemented. The different illustrative embodiments can be implemented in a system including components in addition to or in place of those illustrated for the determination system 100. Other components shown in FIG. 1 can be varied from the illustrative examples shown. The different embodiments can be implemented using any hardware device or system capable of running program code. In another illustrative example, determination system 100 can take the form of a hardware unit that has circuits that are manufactured or configured for a particular use. This type of hardware can perform operations without needing program code to be loaded into a memory from a computer readable storage device to be configured to perform the operations. For example, mobile device 105 can take the form of a circuit system, an application specific integrated circuit (ASIC), a programmable logic device, or some other suitable type of hardware configured to perform a number of operations. With a programmable logic device, the device is configured to perform any number of operations. The device can be reconfigured at a later time or can be permanently configured to perform any number of operations. Examples of programmable logic devices include, for example, a programmable logic array, programmable array logic, a field programmable logic array, a field programmable gate array, and other suitable hardware devices. With this type of implementation, software modules 130 can be omitted because the processes for the different embodiments are implemented in a hardware unit. In still another illustrative example, determination system 100 and/or mobile device 105 can be implemented using a combination of processors found in computers and hardware units. Processor 110 can have a number of hardware units and a number of processors that are configured to execute software modules 130. In this example, some of the processors can be implemented in the number of hardware units, while other processors can be implemented in the number of processors. In another example, a bus system can be implemented and can be comprised of one or more buses, such as a system bus or an input/output bus. Of course, the bus system may be implemented using any suitable type of architecture that provides for a transfer of data between different components or devices attached to the bus system. Additionally, communications interface 150 can include one or more devices used to transmit and receive data, such as a modem or a network adapter.

The operation of system 100 and the various elements and components described above will be further appreciated with reference to the various methods and other technologies described and illustrated herein. It should also be understood that, in certain implementations, various methods, operations, determinations, etc., described herein can be performed at central machine 168 (as shown in FIG. 1), e.g., in lieu of or in addition to being performed at device 104 and/or one or more other devices/elements depicted in FIG. 1. Thus, while any one of operations, functions, etc. described throughout the present disclosure may be illustrated as performed at and/or upon a particular machine or device (such as mobile device 105, mobile device 160, and/or central machine 168), such description should be understood as being exemplary and/or illustrative and not limiting. Accordingly, it can be appreciated that any and all steps, operations, and/or functions described herein with regard to a particular device and/or machine (such as device 105) should be similarly understood to be similarly capably of employment at another device and/or machine (such as central machine 168, vehicle data system 164, etc.), substantially in the manner described herein, without departing from the scope of the present disclosure. It should be understood that central machine 168 can be, for example a server machine, a laptop/desktop computer, a smartphone, etc., and can incorporate some or all of the elements/components depicted with respect to device 105 (and/or any of the other devices depicted in FIG. 1 and/or described herein).

It can be appreciated that, in certain implementations, performing various operation(s) at central machine 168 (as opposed to at mobile device 105, for example) provides several advantages in certain scenarios. For example, certain operations can be quite resource intensive, and shifting this analysis to central machine 168 ensures that the system resources of mobile device 105 remain relatively free. Additionally, in certain arrangements central machine 168 can be operated by a law enforcement agency, insurance agency, etc. and, as such, a centralized approach can provide such an agency with the ability to monitor and/or adjust the operational capacity of mobile device 105 as necessary. Moreover, in certain scenarios this centralized approach can be easier to implement with respect to regulatory compliance and preventing tampering.

As noted above, in certain implementations the described technologies (e.g., processor 110 of device 105 executing one or more of software modules 130, e.g., determination module 170) can transforms an operation state of the mobile device 105 based on various determination factors (such as a probability computed with respect to whether a user is a driver or a passenger of a vehicle), and can initiate various actions/operations based on such determination For example, if the computed probability indicates that the in-vehicle role of a user of mobile device 105 is likely to be a driver, processor 110 can coordinate the disabling of one or more features of the mobile device 105, such as the disabling of any and/or all features that enable the entry of text into mobile device 105. In doing so, existing safety risks can be reduced by preventing a user who has been determined to be likely to be a driver of a vehicle from using various regular functions of mobile device 105 that are likely to distract the user and increase safety risks while driving and/or are restricted and/or prohibited based on the vehicle's current (or most recently known) location, as preferably determined in conjunction with GPS 145C. In other arrangements, one or more other transformations to the operation state of mobile device can be similarly applied based on the computed probability. For example, notifications (such as warning notifications) can be provided at the mobile device 105, notifications can be transmitted to third parties (notifying a third party, such as a law enforcement agency, of the in-vehicle role of the user of mobile device 105 and/or of the particular operation of the mobile device 105, such as that typing is being performed upon mobile device 105), instructions can be provided to third parties (such as a cellular service provider) to change an operation state of mobile device 105 (such as temporarily disabling the communication ability of mobile device 105), and/or one or more applications executing or executable on mobile device 105 can be disabled (such as a text messaging application).

In certain implementations, inputs originating from one or more motion sensors (e.g., accelerometer, gyroscope, etc.) of a device can be processed to determine the class of the vehicle within which the device is located (e.g., car, bus, train, etc.) and, based upon the determined vehicle class, one or more restrictions (and/or no restrictions) can be employed at/in relation to the device. For example, based on the difference between the rates and lengths of acceleration of different vehicle classes, it can be determined whether the pattern of acceleration that can be perceived based on various inputs originating from and/or determined with respect/in relation to a device (e.g., accelerometer, GPS, cellular, WiFi) reflects that the device is present within a train (e.g., the forward acceleration of a train is an order of magnitude lower than the forward acceleration of a car, while the length of sustained acceleration of a train is longer than that of a car), a policy of no restrictions is applied to the device on the premise that it is a passenger device (while different policies can be applied to those few devices of users who are train conductors, bus drivers etc.).

Additionally, in certain implementations various techniques described herein can pertain to determinations as to whether or not a device is present/operational 'within a vehicle' (e.g., a moving vehicle) and/or 'within a trip' (e.g., a trip within a moving vehicle) (it should be noted that such terms can be used interchangeably). In doing so, various aspects of the power consumed/expended by a device (such as in order to make one or more of the referenced determinations) can be reduced. Moreover, one or more of the referenced techniques can also be implemented to determine or otherwise detect other contexts while consuming/expending relatively less power, e.g., determining the in-vehicle role of a user of a particular device, whether or not a device is present within a class or on school grounds, what mode/class of transportation/vehicle the device is present within (e.g., car, train, bus, bicycle, walking, etc.), whether or not the user is a vulnerable road user, and more.

As noted above, while any one of the particular steps, operations, and/or functions are described herein as being performed at and/or upon a particular machine or device (such as mobile device 105, mobile device 160, and/or central machine 168), such description should be understood as being exemplary and/or illustrative and not limiting. Accordingly, it can be appreciated that any and all steps, operations, and/or functions described herein with regard to a particular device and/or machine (such as mobile device 105) should be similarly understood to be similarly capably of employment at another device and/or machine (such as central machine 168), substantially in the manner described herein, without departing from the scope of the present disclosure.

As referenced above, in certain implementations, upon determining that a mobile device 105 is present with a vehicle, and further determining that the vehicle is in motion (e.g., based on inputs originating from various sensors, etc.), a restriction can be employed with respect to the device. Such a restriction can be, for example, one or more instructions that dictate at least one operation state of the mobile device. Examples of such restrictions include but are not limited to: instructions that disable a particular feature or functionality of a mobile device 105 (such as the ability to type text), instructions that disable multiple features or functionalities of a mobile device 105 (such as the ability to launch certain applications and the ability to receive text messages), and instructions that functionally "lock" mobile device 105 by effectively disabling many or all of the functionalities of the device. It should be understood that in various arrangements, including many of those described herein, the various restrictions employed at mobile device 105 are directed towards configuring mobile device 105 in such a manner that operation of and/or interaction with the device is difficult, inconvenient, and/or impossible (that is, it can be said that operation of mobile device 105 is impeded) for a user who is also simultaneously operating a vehicle. At the same time, such restrictions are also preferably configured to create minimal, if any, difficulty and/or inconvenience when operated by and/or interacted with by a user who is not simultaneously operating a vehicle. In other words, it can be said that such restrictions preferably impede operation of the mobile device by a user who is a driver moreso than they impede operation of the mobile device by a user who is a passenger.

In another implementation, a determination can be made as to when the device is present/operating within a moving vehicle and, based on such a determination, the device can initiate an operation mode that can selectively restrict one or more functionalities of the device ("Driver Mode").

In certain implementations, one or more of the techniques described herein can be configured to determine whether a device is (or is likely to be) within a moving vehicle based on (a) signals that are measured by the device itself (e.g., by the internal accelerometer) or provided/imparted from external devices (e.g., cellular network, other terrestrial or non-terrestrial infrastructure, the vehicle or other vehicles, WiFi networks, GPS networks) and received at the device and/or (b) signals that are provided/imparted from the device (e.g., RF cellular signals) and picked up external to the device (e.g., the cellular network, other infrastructure, the vehicle or other vehicles), such as is described herein.

In certain implementations, a device determined to be located within a vehicle can process various inputs, such as in order to characterize/determine the nature of a particular movement of the vehicle. For example, various inputs can be processed in order to differentiate between a vehicle that has recently stopped moving and is likely to continue its present trip (e.g., stopped at a red light or stopped in traffic) from a vehicle that has recently stopped moving and is relatively likely to have finished its present trip. In doing so, it can be determined when usage/operational restrictions (such as those described herein) employed with respect to a device determined to be operated by a driver of a vehicle should be lifted or otherwise modified/eased (e.g., upon determining that the vehicle is relatively likely to have finished its present trip, as opposed to only coming to a temporary stop), such as in the manner described herein.

Additionally, in certain implementations, various inputs (e.g., motion inputs, etc., such as those that correspond to slowing down/stopping) can be received in relation to a geographic location (e.g., one or more coordinates, a location on a map, an address, etc.). In certain implementations, the referenced geographic location can include, incorporate, and/or otherwise be associated with information, parameters, metadata, etc., such as may reflect or otherwise pertain to a presence of a stop sign, traffic light, a parking lot, parking spot, a non-temporary location such as an office or home, etc. (and/or any other such status or indication that may reflect a likelihood that a vehicle stopping there may be likely to maintain such a stop for a relatively short time, such as at a stop sign or traffic light, or a relatively longer time, such as at a parking spot or parking lot) at the geographic location. As described herein, the presence of such items at/in relation to the location can be used/accounted for in determining whether the incidence of deceleration (e.g., the stopping of a vehicle) is likely to be maintained for a relatively shorter time duration (e.g., in the case of a vehicle stopping at a stop sign) or a relatively longer time duration (e.g., in the case of a vehicle stopping in a parking lot or parking spot).

In certain implementations, GPS 145C of mobile device 105 can be used, in certain arrangements, in conjunction with other sensors, to identify the in-vehicle position of mobile device 105. In certain arrangements this is achieved in part based on knowledge of the lane boundaries of the road on which the vehicle is driving (based on map data or computation/observation), together with a determination of mobile device's 105 location, using GPS 145C, to be on the right or left side of such lane. If mobile device 105 is in the left part of its current lane, then it can be determined to be on the left side of the vehicle within which it is traveling, while if it is in the right part of its current lane, then it is on the right side of the vehicle. Such in-lane location calculations can further be averaged over time to increase the accuracy of the location of the mobile device 105 within its then current lane and, as a result, the accuracy of the determination of the location of mobile device 105 inside the vehicle.

In some implementations e.g., in circumstances where a device's location cannot be accurately determined using regular/default techniques/means (e.g., no GPS, no wireless signals) or using augmentation (e.g., dead reckoning), a device's location may be estimated by crowdsourcing the navigation routes being traversed (or that were previously traversed) by the device and other devices located in the same location/within a certain proximity of the device, where the overlaps (or the cessation in overlap) in such routes can provide an indication as to the device's (and the devices') current location. The various navigation routes can be communicated between the devices using methods and/or protocols such as Bluetooth, WiFi, other RF wireless, audio, etc. For example, if Device 1 is routed to travel route ABCDE and Device 2 (which is currently is the same approximate location as Device 1 and is directly or indirectly communicative with it), is travelling route QBCRY— then it can be determined that the devices are likely to be on the segment BC and on the mode of transport (e.g., train, bus, car) and entity of transport (e.g., Train number '100', Bus number '34A,' car), associated with BC.

In certain implementations, additional information as to location of a device can be obtained/determined, e.g., when a second device that was located in the same location/within a certain proximity of the first device is no longer located in the same location/within a certain proximity of the device. For example, if, after being able to communicate with Device 2 for some time that was determined to be during the travel of segment BC, Device 1 is determined to no longer be communicative with Device 2, Device 1 can determine that it has likely passed point C. The strength of this determination can be increased/weighted (and may be estimated) based upon the communications behavior of additional devices currently and/or previously located in the same location/within a certain proximity (e.g., a new device located in the same location/within a certain proximity of a certain device is travelling route MCDT, a device previously located in the same location/within a certain proximity of the certain device is travelling route NBCS stops being communicative).

The described techniques can be effective, for example, in a subway where GPS and other wireless signals are not typically/consistently available. The described techniques can be further enhanced using techniques that use motion sensors and/or environmental sensors on (or in communication with) the device(s). For example, during rush hour (i.e., many users with devices travelling) and the motion sensors on a device sense a stop and the population of devices and/or the routes they are travelling changes substantially shortly after the motion stop is determined, it can be further determined to be likely that the stop was at a station where people go on and/or off the train, whereas if the population of devices and/or the routes they are travelling doesn't change substantially after the motion stop, it was likely a stop between stations in which users do not typically enter and exit.

In certain implementations, it can be advantageous, such as in relation to a navigation application, to notify a user when the route that is usually optimal from their current location to their current destination (as is determined by navigation applications that implement dynamic routing, such as Waze, as well as those using static routing), is determined to be sub-optimal, such as on a temporary basis (e.g., due to road work, heavy traffic, etc.). It should be understood that the referenced 'current destination' of the user can be determined, for example, based on a user input (e.g., audio, touch, visual [e.g., gestures], etc., inputs) into the navigation application, and/or can be determined (or "learned"), such as based on historical routes taken by such user (which can be accounted for based on the days of the week and/or the different times of day during which such routes are determined to be traveled, for example).

In certain implementations route, etc.—related notification(s) that are determined to be of particular/increased significance, importance, etc., to a user can be provided via one or more interfaces (e.g., interfaces of the device and/or interfaces external to the device). Examples of such interfaces include but are not limited to a display interface, an audio interface, an illumination interface, or a haptic interface. Moreover, in certain implementations the referenced notification can be provided in a manner that is relatively more prominent than the notification(s) provided with respect to the prior navigation operations (that is, relatively more prominent than notifications provided previously/earlier within the same trip) (e.g., in order to draw greater attention to the notification). For example, the notification can be provided in a manner that is, for example, relatively louder, relatively faster, relatively brighter, relatively stronger, relatively slower, relatively more redundant (e.g., by repeating an instruction multiple times), relatively longer, relatively more dynamic (e.g., moving more/faster on display), relatively bolder, relatively larger (e.g., in font), relatively more red or yellow in hue, etc., than the notifications provided with respect to the prior navigation operations (that is, relatively louder, etc., than notifications provided previously/earlier within the same trip). In certain implementations, the referenced notification(s) can be provided in a different voice, tone of voice, etc. (e.g., in a 'male' voice, in contrast to the manner in which other notifications are provided, e.g., in a 'female' voice) than the notifications provided with respect to the prior navigation operations. In certain implementations, the referenced notification(s) can be provided in conjunction with non-verbal sounds/tones (e.g., such instructions can be preceded by a 'beep'). Additionally, in certain implementations a degree to which the operation is relatively unlikely to be complied with can be determined (such as in a manner described herein) and, based on the degree to which the navigation instruction is relatively unlikely to be complied with, at least one of the one or more interfaces at which to provide the one or more notifications can be selected (for example, one interface—e.g., an audio interface—can be selected if the operation is highly unlikely to be complied with, while another interface—e.g., a visual interface—can be selected if the operation is relatively less unlikely to be complied with). Moreover, in certain implementations a degree to which the operation is relatively unlikely to be complied with can be determined and, based on the degree to which the navigation instruction is relatively unlikely to be complied with, the notification can be provided in a manner that is relatively more prominent than one or more other notifications provided with respect to the one or more prior navigation operations (for example, with respect to an operation that is highly unlikely to be complied with, the navigation instruction can be provided in a highly prominent manner—e.g., considerably louder than other instructions during the trip—while with respect to an operation that is relatively less unlikely to be complied with, the navigation instruction can be provided in a relatively less prominent manner—e.g., only somewhat louder than other instructions during the trip).

Additionally, in certain implementations such a notification can be generated based on a determination that the navigation instruction deviates from one or more prior navigation operations (or previously/frequently traveled/used routes). Such a notification can include a notification not to perform (e.g., with respect to the referenced location) an operation in accordance with the one or more prior navigation operations (for example, "at the upcoming intersection, don't continue straight like you normally do"), and/or a notification to perform the navigation instruction with respect to the location (e.g., "at the upcoming intersection, turn right").

It should be noted that the navigation techniques described herein can be applied/configured with respect to any/all forms of navigations (e.g., all forms of motor vehicles, non-motorized vehicles, pedestrian activities and whether outside, inside, on Earth, in space, in any medium (e.g., air, water, other), whether initiated by the user, a 3rd party or autonomously, etc.).

It should be noted that, in certain implementations the delivery of navigation instructions, and in particular haptic instructions, to wearables/implantables can be more effective than those haptic instructions delivered to non-wearable mobile.

FIG. 2 is a flow diagram of a routine that illustrates aspects of one or more methods, such as those described in relation to one or more embodiments described herein. In various implementations, one or more aspects of the referenced method can be performed by one or more hardware devices/components (such as those depicted in FIG. 1), one or more software elements/components (such as those depicted in FIG. 1), and/or a combination of both. At 210, one or more override criteria can be received. In certain implementations, such override criteria can include one or more criteria that, when met, override one or more operations of a device. Examples of such override criteria include but are not limited to: (a) a geographic area, (b) a chronological interval, or (c) a state of the device. As described herein, such criteria dictate the criteria, context, etc. with respect to which presentation of a navigation application (e.g., at the device) is not to be prioritized, e.g., within a user interface of the device. For example, such override criteria can dictate that even in a scenario in which the presentation of a navigation application would otherwise be prioritized (e.g., brought to the foreground and/or otherwise made visible on a mobile device) upon determination that the device is approaching the geographic area that corresponds to the navigation operation that exceeds the defined importance threshold, in a scenario in which such criteria is present (e.g., the device is close to a home location), such interface of a navigation application is not to be prioritized. At 220, it can be determined that presentation of a navigation application executing on a device during a trip is not prioritized within the user interface of the device (e.g., is operating in the background and/or is otherwise not visible to the user, e.g., if the display of the device is off). At 230, a location of the device can be determined, e.g., in relation to a geographic area that corresponds to a navigation operation that exceeds a defined importance threshold (e.g., a location that corresponds to a navigation instruction that has increased importance/significance for the user, e.g., as determined in a manner described herein). At 240, presentation of the navigation application can be prioritized, e.g., within the user interface of the device (e.g., brought to the foreground and/or otherwise made visible on a mobile device), and/or within any other user interfaces (e.g., of another device, e.g., an infotainment system, etc.). In certain implementations, such a presentation can be prioritized based on a determination that the device is approaching the geographic area that corresponds to the navigation operation that exceeds the defined importance threshold (e.g., a location that corresponds to a navigation instruction that has increased importance/significance for the user, e.g., as determined in a manner described herein). In certain implementations, presentation of the navigation application can be prioritized within the user interface of the device based on a determination that the override criteria are not present (e.g., the criteria received at 210). Such a prioritization of the application within the user interface can also include various aspects of the described/referenced increasing of the prominence of an instruction, e.g., by providing various additional audio, visual, haptic, etc., notifications/alerts, etc.

By way of further illustration, in certain implementations, in a scenario in which a visual UI of a navigation application that is not currently running in the foreground on a device on which it is providing such visual UI, upon determining that the device is approaching an instruction that can be determined to be sufficiently important (e.g., above a certain threshold) (e.g., a critical instruction, etc., as determined in one or more ways described herein), the referenced visual UI can be pushed to the foreground of the device. Additionally, in certain implementations, in a scenario in which the screen of the device on which a navigation app is delivering visual UI is turned off, such screen can be turned on as the device/user approaches such an instruction that can be determined to be sufficiently important.

In certain implementations, the user of a route guidance application may define various override criteria, such as by selecting one or more geographic regions (and/or the user may be presented with recommendations for such regions and the associated app behaviors) within which and/or outside of which the application can be configured to operate differently than usual (e.g., no voice instructions, no voice instructions unless there is a route that can save at least 15 minutes, etc.). Such selection(s) can be provided/input to the device via one or more interfaces (e.g., voice, touch, gesture or by accepting default values proposed by or via the device). Such selection(s) may (i) apply to one trip (e.g., on the current trip, do not give voice instructions until we've left my neighborhood); (ii) apply to multiple trips (e.g., never give me voice instructions on weekday mornings when I am within 5 km of my workplace); (iii) be conditioned on arriving (or leaving) a region/location (e.g., do not give voice instruction until I enter the U.S 101 highway); (iv) be conditioned on a starting location, a current location and/or a destination (e.g., when my starting location is work and my destination is home, do not give me voice instructions before I get on the highway and or after I get off the highway); and/or (v) be conditioned on a current device characteristic, for example, the device's power state (e.g., connected to power, battery level) (e.g., if I am not connected to power, do not provide continuous guidance until I exit my neighborhood).

In certain implementations, various comparisons between the current route and previously traveled routes may also include one or more previous routes manually or semi-manually input into the device by the user (e.g., a user can input their commuting route into device as part of navigation app installation/configuration process).

In certain implementations, various factors and/or states (such as those related to the navigation application and/or various other devices, elements, etc.) can be used to determine the probability of the that a user (e.g., a driver) is unlikely to comply with one or more operations and/or is going to make some other form of mistake. Examples of such factors, states, etc., include but are not limited to: whether the screen of the device on which the navigation application is to be visually displayed in an 'on' state or otherwise visible, and, even if the display is 'on,' whether the navigation application is in the foreground of the device/operating system (such that it is readily visible) or in the background (such that it is not readily visible), environment/conditions in which the vehicle is traveling (e.g., the lane location as perceived/determined by one or more in-vehicle cameras or extra-vehicle cameras, e.g., transmitting information using vehicle to infrastructure (V2I) protocols), the speed of the vehicle as determined/perceived by a GPS or speedometer (whether in-vehicle or extra-vehicle), traffic conditions as perceived/determined by one or more cameras or through 3rd party information, the noise level in or around the vehicle (which may affect the user's ability to hear instructions), and/or any activities in which the user is engaged (e.g., a phone call, which may affect the user's cognitive ability to "consume" instructions).

FIG. 3 is a flow diagram of a routine that illustrates aspects of one or more methods, such as those described in relation to one or more embodiments described herein. In various implementations, one or more aspects of the referenced method can be performed by one or more hardware devices/components (such as those depicted in FIG. 1), one or more software elements/components (such as those depicted in FIG. 1), and/or a combination of both. At 310, an importance of one or more navigation instructions can be determined. In certain implementations, determining an importance of one or more navigation instructions can include determining the importance of the one or more navigation instructions with respect to a user, determining the importance of the one or more navigation instructions with respect to a user based on a navigation history associated with the user, determining a likelihood that a user is to make an error with respect to/not comply with the one or more navigation instructions (the likelihood that the user is to make an error with respect to/not comply with the one or more navigation instructions can be determined based on: a travel history of the user, a travel history of one or more users, an age of the user, a gender of the user, a time of day, a day of week, traffic conditions pertaining to a location associated with the one or more navigation instructions, weather conditions pertaining to a location associated with the one or more navigation instructions, and/or environmental conditions pertaining to a location associated with the one or more navigation instructions), determining a cost associated with non-compliance/making an error with respect to the one or more navigation instructions, determining a cost associated with a user making an error with respect to the one or more navigation instructions (the cost associated with a user making an error/noncompliance with an instruction can be determined based on: an amount of time to be added to a trip in response to an occurrence of the error, and/or a degree of priority associated with the user completing the one or more navigation instructions, and the degree of priority associated with the user completing the one or more navigation instructions can be determined based on one or more scheduling entries or one or more electronic communications associated with the user, an estimated/determined loss of time to the user as a result of noncompliance with an instruction, an estimated/determined change in travel distance by the user as a result of noncompliance with the instruction, an estimated/determined change in economic cost to the user as a result of noncompliance with the instruction, an estimated/determined change in environmental impact as a result of noncompliance with the instruction, an estimated/determined change in safety risk as a result of noncompliance with the instruction, etc., such as in a manner described herein), and/or determining the expected cost with respect to the one or more navigation instructions, such as in a manner described herein. At 320, a manner in which to provide the one or more navigation instructions can be identified, such as based on the importance (e.g., based on a computed likelihood of non-compliance by the user with the instruction and/or the computed cost to the user associated with noncompliance with the instruction). In certain implementations, one or more interfaces at which to provide the one or more navigation instructions can be identified and/or selected, such as in a manner described herein. Moreover, in certain implementations a relative prominence with which to provide the one or more navigation instructions can be determined, such as based on the importance. At 330, the one or more navigation instructions can be provided in the identified manner (e.g., via the selected interface).

Additionally, in certain implementations, further aspects of the described technologies can implement various operations/methods, such as: receiving one or more inputs; processing, by a processing device and with respect to a navigation instruction, the one or more inputs to compute a probability of non-compliance by a user with the navigation instruction; based on a determination that the probability of non-compliance by the user with the navigation instruction exceeds a defined threshold, selecting a first interface at which to provide a notification that corresponds to the navigation instruction, and providing the notification via the selected first interface; and based on a determination that the probability of non-compliance by the user with the navigation instruction does not exceed the defined threshold, selecting a second interface at which to provide the notification that corresponds to the navigation instruction, and providing the notification via the selected second interface.

Additionally, in certain implementations, further aspects of the described technologies can implement various operations/methods, such as: receiving one or more routes previously traveled by a user, each of the one or more routes comprising one or more navigation instructions; comparing the one or more routes previously traveled by the user with a navigation instruction included in a route currently being traveled by the user; based on a comparison of the one or more routes previously traveled by the user with the navigation instruction included in the route currently being traveled by the user, computing a probability of non-compliance by the user with the navigation instruction; based on a determination that the probability of non-compliance by the user with the navigation instruction exceeds a defined threshold, selecting one or more interfaces at which to provide a notification that corresponds to the navigation instruction; and providing the notification via the selected one or more interfaces.

By way of further illustration, in certain implementations, the referenced interface(s) can be selected and/or the navigation instructions can be delivered differently based on their determined importance for a particular user or group of users (e.g., higher sound volume for more important instructions). The importance of an instruction can be determined based on one or more factors such as (a) the likelihood of the user making an error (or a particular error) in performing the instructions and/or one or more aspects related thereto; and/or (b) the determined cost (or the negative utility) of the user making an error (or a particular error) in performing the instructions and/or one or more aspects related thereto.

The likelihood of a user making an error (or a particular error) performing a particular navigation instruction (that is, not complying with the referenced instruction) and/or one or more aspects related thereto can be personal and predictable (e.g., different likelihoods of different errors can be determined with respect to different instructions for different users). Such likelihood can be determined based on one or more factors, such as (a) the user's travel history; (b) the travel history of a population of users; (c) the user's age' (d) the user's gender; (e) the time of day; (f) day of week; (g) the traffic conditions at or near the instruction location; (h) the weather conditions at or near the instruction location; (i) environmental conditions in or around the vehicle, (j) the route traveled including its direction, (k) the device state of a device associated with the user (e.g., whether a turn signal or 'blinker' is being utilized, indicating that a user is likely to make a turn in a particular direction shortly), and/or (1) one or more of the various other techniques and/or factors described herein with respect to determining a likelihood of compliance (e.g., based on geographic location, speed, proximity to the location associated with an instruction, lane a user is traveling in, various combinations thereof—e.g., the speed being traveled as the user approaches the location at which the instruction is to be performed, etc.).

For example, the likelihood of a particular user erring in making a turn at a complicated highway interchange is very low if she travels on such route every day, but much higher if she has never traveled on such route before. In another example, the chance that a user approaching an intersection (from the south), who usually turns right at such intersection (when approaching from the south) and who is supposed to turn left today is likely to make (a) a "turn right" error is high; and (b) a "go straight" error is low.

The cost of the user making an error (or a particular error) in performing a particular navigation instruction and/or one or more aspects related thereto can also be personal and predictable. It can be determined, for example, based upon one or more factors, such as (a) the time that will be added to the trip from an error (or a particular error) (for example, the cost of turning right instead of left at the upcoming intersection will add 45 minutes to the route); (b) the cost of the user not arriving at the destination on time (e.g., based on her calendar entry and/or emails and/or destination, the user has a high priority meeting at 10:00 am with 10 other people all ranked above her in her organization versus the user doesn't have any meeting scheduled).

It should be understood that, as described herein, in certain implementations, the cost of non-compliance with/ making an error with respect to an instruction can be computed as/with respect to an expected cost of the result of non-compliance with the instruction. Such an expected cost can be computed, for example, as the product of the cost of non-compliance with the instruction, e.g., for a particular outcome (e.g., how late the user is to a meeting) for that user at that time, multiplied by the determined likelihood of such outcome for that user at that time (which, additionally, may be summed over several or all possible outcomes).

For example, as noted, the referenced cost (e.g., the cost associated with making an error/not complying with one or more instruction(s)) can be determined by/based on a cost of non-compliance by the user with a scheduling entry and/or the likelihood of non-compliance by the user with a scheduling entry. It should be understood that such a scheduling entry can correspond to an electronic calendar entry which can include various parameters, information, etc., including the time and duration of an event, the location of the event, the identities of others participating in the event, further information regarding the subject matter of the event (e.g., an agenda for the event), etc. Accordingly, such a calendar entry associated with the user can be processed in order to determine a cost associated with non-compliance with such a calendar entry. For example, in a scenario in which the user is traveling to an event (details/aspects of which are reflected in a scheduling entry associated with the user), an expected cost of non-compliance with an instruction (e.g., a navigation instruction on a route that the user is traveling towards the event) can be computed, for example, as the cost to the user (e.g., at such time) of missing a certain portion of the event if the referenced instruction is not complied with, multiplied by a computed likelihood that the user (e.g., at such time) is to miss the referenced portion of the event in a scenario in which the instruction is not complied with (which may be further summed over some or all possible event portions missed).

The manner in which the referenced cost associated with non-compliance with a navigation instruction can change based on a scheduling entry can be illustrated in relation to a scenario in which such a scheduling entry reflects that the user is scheduled to attend a meeting that begins in 120 minutes. In such a scenario, when the user is traveling to the referenced meeting (which, as noted, begins in 120 minutes) and the expected/estimated travel time until the user arrives at the location associated with the meeting is 120 minutes (or within a defined time interval within such time), the cost(s) associated with the navigation instruction(s) that the user is to perform in order to arrive at the meeting within the estimated timeframe can be determined to have a relatively higher cost (since, if the user doesn't comply with the referenced instruction(s), the user is likely to miss part of the meeting). Moreover, in certain implementations, those instructions which, if not complied with, are likely to significantly increase e.g., above a defined threshold/amount) the estimated time until the user arrives at the referenced meeting can be determined to have a yet higher cost (in light of the fact that such instruction(s), if not complied with, may significantly affect the ability of the user to attend the meeting). Conversely, in a scenario in which the user is traveling to the referenced meeting (which, as noted, begins in 120 minutes) and the expected/estimated travel time until the user arrives at the location associated with the meeting is 30 minutes (or within a defined time interval within such time), the cost(s) associated with the navigation instruction(s) that the user is to perform in order to arrive at the meeting within the estimated timeframe can be determined to have a relatively lower cost (since, even if the user doesn't comply with the referenced instruction(s), the user still likely arrive at the meeting on time).

It should be understood that, as noted above, the referenced cost associated with non-compliance with a scheduling entry can include and/or account for both the cost of noncompliance with the scheduling entry as well as a likelihood that the scheduling entry is not to be complied with (e.g., based on/in relation to non-compliance with a navigation instruction). In certain implementations, the referenced cost associated with non-compliance with a scheduling entry can include and/or reflect an importance/value associated with a scheduling entry. Such an importance/value can be computed, for example, based on various parameters of the scheduling entry, e.g., the identity of others associated with the scheduling entry (e.g., other attendees at a meeting, such as a client or supervisor of a the user), a subject/topic associated with the scheduling entry (e.g., 'Discuss $10 million proposal,' 'pick up dry cleaning,' etc.), the length of time since the scheduling entry was created (e.g., a meeting scheduled far in advance may be relatively more important), etc. Additionally, in certain implementations, the referenced likelihood of non-compliance with a scheduling entry can reflect the degree of likelihood that the user is to not comply with the scheduling entry (e.g., not arrive at a location associated with the scheduling entry by the time or within a defined chronological interval of the time associated with such a scheduling entry). Thus, for example, as described above, a relatively low likelihood that a user is to miss or be late with respect to a scheduling entry (even for an important event, as determined, for example, based on the attendees, topic, agenda, etc.) can lower the overall significance/importance/cost associated with non-compliance with a navigation instruction provided to a user that is traveling to a location associated with the referenced entry (since, as noted, the user is still likely to comply with the scheduling entry, even if a particular navigation instruction is not complied with). Conversely, in a scenario in which a scheduling entry can be determined to be relatively unimportant/associated with a relatively low cost (e.g., if missed), such a cost can be increased based on a determination that non-compliance with a particular instruction is likely to entail noncompliance with the scheduling entry (e.g., if a user misses a particular turn, by the time other navigation instructions are provided to reroute them to the destination, an establishment—e.g., the dry cleaners that they are traveling to in order to pick up their dry cleaning—will be closed).

Additionally, in certain implementations, the importance of an instruction (e.g., with respect to a particular user) can be determined (partially or fully) based on observed/determined behaviors of other users, such as a population of other users who have previously received the same (or similar/comparable) instruction and/or have traveled at the same or similar/comparable location and/or along the same route as the user is presently traveling.

For example, in a scenario in which a particular user cannot be determined to have traveled on a navigation route from point 'A' to point 'B' (or has not recently traveled, e.g., within a certain timeframe, or has never received instructions, e.g., from a navigation application, with respect to the referenced route, or there is no information of an instance of travel and/or instructions associated with travel with respect to the referenced user, e.g., in a data set being used to score the importance of instructions), data associated with the historical behaviors of other users in the same or comparable scenarios can be used to determine the importance of a particular instruction, e.g., with respect to the particular user. By way of illustration (and with respect to the navigation of a particular user from point 'A' to point 'B'), based on a determination that, historically, 95% of the users arriving at point 'B' from point 'A' then proceed to travel (or are instructed to travel) from 'B' to point 'D' and only 5% of the referenced users then travel (or are instructed to travel) from point 'B' to point 'C,' yet today the particular user is routed to travel along route 'A-B-C,' it can be determined that the importance of the instruction to travel from point 'B' to point 'C' is relatively high (by virtue of the referenced being relatively unusual, as compared with historical scenarios in which the vast majority of other users are determined to have traveled from point 'B' to point 'D'). Accordingly, it can be further determined that it is relatively likely that the particular user, like the population of other users, is also used to travel and/or is likely to travel (by instinct/habit) towards point 'D' after traveling from point 'A' to point 'B,' despite the fact that the described technologies may not have necessarily observed (at all or above a certain degree of certainty) specific navigation instances with respect to the particular user. It can be further appreciated, based on the referenced determination that the vast majority of users proceed to point 'D' after traveling from point 'A' to point 'B,' that the transportation infrastructure (e.g., signs, lighting, number of traffic lanes, etc.) present on such a route (e.g., at or near point 'B') may be oriented towards the masses who are to proceed to point 'D.' This, too, may increase the chance of the particular user continuing towards point 'D' after traveling from point 'A' to point 'B,' in lieu of traveling to point 'C' (as dictated by the route such a user is to follow). Accordingly, upon making such determination(s), the described technologies can provide the referenced instruction(s) (that is, instructions that correspond to traveling to point 'C' upon completing travel from point 'A' to point 'B') in a manner that emphasizes such an instruction, e.g., via one or more of the voice, visual, haptic, etc., interfaces, as described herein. Additionally, in certain implementations, upon determining that the importance of a particular instruction (e.g., by virtue of it having a relatively low cost of non-compliance) is relatively low, the described technologies can provide such an instruction in a manner that de-emphasizes such an instruction, e.g., via one or more interfaces that are relatively less obtrusive, and/or by suppressing/precluding the presentation or providing of such an instruction, such as is described herein.

Moreover, it can be appreciated that in certain scenarios, non-compliance with a particular instruction alone may not necessarily be associated with a relatively high cost, however, non-compliance with such first instruction may, as a result, increase the likelihood of non-compliance with a second instruction which itself may have a relatively high cost associated with its non-compliance. Accordingly, in certain implementations, the determination of a cost associated with non-compliance with a particular instruction (as described herein) may not necessarily only account for the immediate cost associated with non-compliance with such an instruction alone, but rather may also account for the manner in which such non-compliance with a first instruction may, in turn, affect the likelihood of such a user not complying with other instruction(s) (which, for example, may be associated with other, e.g., higher, non-compliance costs). For example, a navigation route may include a sequence of navigation instructions 'A,' 'B,' and 'C.' As described herein, it can be appreciated that a greater cost can be associated with a particular navigation instruction based on, for example, the fact that, for example, if such a particular instruction is not complied with, a significant amount of additional time will be added to the trip. Thus, for example, in a scenario in which instruction 'B' (e.g., entering a highway) has a high cost (in that if the instruction is not complied with, significant additional time is likely to be added to the trip), despite the fact that a preceding instruction (e.g., instruction 'A') may not, alone, be associated with such a high cost, by virtue of the fact that by not complying with instruction 'A,' the user increases the likelihood that instruction 'B' will also not be complied with, the cost associated with instruction 'A' can be increased or otherwise adjusted to account for the additional cost (that is, noncompliance with instruction 'B') that may be incurred as a result of noncompliance with instruction 'A.'

In certain implementations, a first set of navigational operations (e.g., directions, instructions, etc.) can be identified/received, such as between an origin and a destination. In certain implementations, such an origin can be an initial/original location or a current location. Moreover, in certain implementations such a destination can include an ultimate/final or intermediate destination. In certain implementations, the referenced set of operations can include those that have been performed (e.g., with at least a defined frequency) by a user associated with the alternative set of navigational operations. Additionally, in certain implementations the referenced set of navigational operations can be those that have been performed (e.g., with at least a defined frequency) by one or more users. Additionally, in certain implementations the first set of navigational operations can include a set of navigational operations previously traveled by a user associated with a device. Then, an alternative set of navigational operations can be determined and/or received. In certain implementations, such an alternative set of navigational operations (e.g., between the origin and the destination) that is likely to be more efficient (for example, more time efficient, more distance efficient, more energy efficient, more safe, more efficient with respect to one or more usage fees, more attractive, be associated with more points of interest, and/or more familiar) (e.g., at a certain point in time) than the first set of navigational operations (such as those identified/received at 6710) can be determined. Moreover, in certain implementations the alternative set of navigational operations can be determined based on one or more additional/other criteria (e.g., in addition to/instead of efficiency) . For example, such alternative set of navigational operations can be determined based on safety (e.g., the usual route is icy/wet/unsafe), legality (e.g., a certain road is presently closed or has a temporarily lower speed limit, a certain turn cannot be made at certain hours/the present time, etc.). The alternative set of navigational operations can then be compared with the first set of navigational operations. In doing so, one or more operations included in the alternative set of navigational operations that deviate from the first set of navigational operations can be identified. One or more of the one or more operations included in the alternative set of navigational operations that deviate from the first set of navigational operations can be provided (e.g., via one or more interfaces). In certain implementations, information pertaining to and/or otherwise reflecting a determination that the alternative set of navigational operations is likely to be more efficient than the first set of navigational operations can be provided. Additionally, in certain implementations the referenced operations can be provided via one or more interfaces (e.g., interfaces of the device and/or interfaces external to the device). Examples of such interfaces include but are not limited to a display interface, an audio interface, an illumination interface, or a haptic interface. Moreover, in certain implementations the referenced operations can be provided in a manner that is relatively more prominent than the notification(s) provided with respect to other navigation operations (that is, relatively more prominent than notifications provided previously/earlier within the same trip) (e.g., in order to draw greater attention to the notification). For example, the operations can be provided in a manner that is, for example, relatively louder, relatively faster, relatively brighter, etc., as described/referenced above. Moreover, in certain implementations a degree to which the operation is relatively unlikely to be complied with can be determined and, based on the degree to which the navigation instruction is relatively unlikely to be complied with, the operations can be provided in a manner that is relatively more prominent than one or more other notifications provided with respect to the one or more prior navigation operations.

Moreover, in certain implementations the referenced operations can be generated and/or provided based on the degree to which the operation is relatively unlikely to be complied with (such as is determined in a manner described herein). Additionally, in certain implementations one or more interfaces at which to provide the referenced operations can be selected, such as based on the degree to which the operation is relatively unlikely to be complied with. Moreover, in certain implementations the referenced operations can be modified, such as based on/in relation to the degree to which the operation is relatively unlikely to be complied with (e.g., by adjusting (a) the volume state of the device, (b) a volume state of an application executing on the device, (c) a display state of the device, (d) a display state of an application executing on the device, (e) a haptic state of the device, and/or (f) a haptic state of an application executing on the device). Additionally, in certain implementations the referenced notifications can be provided to a device associated with a second vehicle. Such operations can reflect, for example, that a first vehicle is relatively less likely to comply with a particular operation. Additionally, in certain implementations one or more vehicle functionalities can be initiated, such as based on a degree to which the operation is relatively unlikely to be complied with (e.g., activating a left-turn lane-change mechanism in the vehicle based on a determination that the driver is unlikely to comply with a left-turn operation). In certain implementations, the referenced operations can be provided in relation to one or more second devices. In certain implementations, such second devices can be/include one or more of the first devices, while in other implementations the referenced first devices can be/include one or more of the second devices. It should also be understood that, in certain implementations, the device state referenced herein can include a volume state of the referenced second device(s), a volume state of an application executing on the second device(s), a display state of the second device(s), a display state of an application executing on the second device(s), a haptic state of at least one of the second device(s), and/or a haptic state of an application executing on at least one of the one or more second devices. As noted, in certain implementations the one or more first devices can include at least one of the one or more second devices and/or the one or more second devices can include at least one of the one or more first devices.

Additionally, in certain implementations information pertaining to a determination that the alternative set of navigational operations is likely to be less habitual to a user than the first set of navigational operations can be provided. Additionally, in certain implementations, information pertaining to a determination that, based on (a) the first set of navigational operations and/or (b) the alternative set of navigational operations, that the alternative set of navigational operations is relatively unlikely to be complied with, can be provided.

Moreover, in certain implementations operations/instructions included in the alternative set of navigational operations that do not deviate from the first set of navigational operations can be prevented from being provided or not provided (e.g., via one or more interfaces).

Additionally, in certain implementations one or more corrective operations can be provided. In certain implementations, such corrective operations can be provided based on/in response to a determination that the one or more operations included in the alternative set of navigational operations are not likely being complied with. Moreover, in certain implementations the referenced one or more operations can be provided or emphasized based on a device state of a device (e.g., in a scenario in which the audio and/or display of the device is off, such as is described herein.

Moreover, in certain implementations, instead of providing one or more operations, the referenced one or more of the one or more operations included in the either set of operations may not be provided, such as when the alternative set of navigational operations do not deviate from the first set of navigational operations. Additionally, in certain implementations, the one or more operations included in the either set or both sets of operations may not be provided when the alternative set of navigational operations do not deviate from the first set of navigational operations.

Additionally, in certain implementations one or more navigation instructions can be generated, such as based on the one or more of the one or more operations included in the alternative set of navigational operations that deviate from the first set of navigational operations and a corresponding one or more operations from at the first set of navigational operations from which the one or more of the one or more operations included in the alternative set of navigational operations deviate. Such one or more navigation instructions can be provided in relation to one or more locations, such as locations associated with the one or more of the one or more operations included in the alternative set of navigational operations that deviate from the first set of navigational operations.

Moreover, in certain implementations the referenced one or more navigation instructions can include a positive/affirmative instruction (e.g., an instruction that instructs a user to perform the one or more of the one or more operations included in the alternative set of navigational operations that deviate from the first set of navigational operations) and a negative instruction (such as an instruction that instructs a user not to perform the one or more operations from at the first set of navigational operations from which the one or more of the one or more operations included in the alternative set of navigational operations deviate).

Additionally, in certain implementations, one or more of the one or more operations included in the alternative set of navigational operations that deviate from the first set of navigational operations can be provided in relation to the device (e.g., the device with respect to which the previously traveled navigational operations are identified/received).

In certain implementations, a user's (or group of users') previous behavior in situations can be weighted, for example so that events that occurred more recently can be ascribed more weight in determining such user's habits. For example, when determining from what direction a user usually approaches a particular intersection (e.g., for determining the likelihood that such user is likely to comply (or not to comply) with a current/future navigation instruction)—instead of accounting for how such user acted in the past, irrespective of when (e.g., how long ago) such events happened, the past observations weighted by how recently they occurred (e.g., linearly, exponential decay).

In certain implementations, a providing of the first set of navigational operations can be precluded or otherwise suppressed (e.g., prevented from being provided/presented), such as based on a determination that the alternative set of navigational operations is likely to be more efficient than the first set of navigational operations or based on the fact that the user is already familiar with them and presenting them may be perceived as unnecessary/annoying.

FIG. 4 is a flow diagram of a routine that illustrates aspects of one or more methods, such as those described in relation to one or more embodiments described herein. At 1105, a destination can be identified, e.g., with respect to an upcoming trip to be taken by a user. For example, an input can be received from the user corresponding to the destination. Moreover, in certain implementations the destination can be projected based on one or more previous trips associated with the user (e.g., a user history). Additionally, in certain implementations the destination can be projected/predicted based on one or more previous trips associated with one or more other users (e.g., other users that are comparable to the user in one or more ways. At 1110, a projected set of navigation operations can be determined for the upcoming trip. In certain implementations, such a projected set of navigation operations can include navigation operations that the user is expected to perform during the trip prior to arrival at the destination. At 1115, an alternative set of navigation operations can be computed for the upcoming trip. Such an alternative set of navigation operations can include navigation operation(s) that are determined to be preferable to the projected set of navigation operations with respect to the upcoming trip based on one or more criteria. In certain implementations, the projected set of navigation operations and/or the alternative set of navigation operations includes navigation operations that pertain to multiple transportation types (e.g., car, public transit, taxi, etc.), as described herein. It should be understood that the referenced criteria can include (but is not limited to): expected time to arrive at the destination, distance to be traveled to arrive at the destination, cost to be incurred to arrive at the destination, safety, beauty, and/or any other such criteria based upon which a user may prioritize one route of travel over another, such as is described herein. At 1120, the alternative set of navigation operations can be compared with the projected set of navigation operations. In doing so, at least one navigation operation that is present in the alternative set of navigation operations and is not present in the projected set of navigation operations, and/or at least one navigation operation that is present in the projected set of navigation operations and is not present in the alternative set of navigation operations can be identified and/or otherwise determined. At 1125, it can be determined that the upcoming trip has been initiated. In certain implementations, such a determination that the upcoming trip has been initiated can be made/arrived at in response to a determination that the alternative set of navigation operations is preferable to the projected set of navigation operations with respect to the upcoming trip based on the one or more criteria (e.g., it is faster, etc.). Additionally, in certain implementations such a determination that the upcoming trip has been initiated can be made based on inputs received from one or more sensors of the device associated with the user (e.g., as described herein), and/or based on a determination that the user is present within a vehicle (e.g., as in a manner described herein), and/or based on a location of the user. At 1130, presentation of a navigation application can be prioritized, e.g., within a user interface of the device associated with the user (for example, a navigation application which was otherwise running in the background of a device, can be brought to the foreground, thereby visually, etc., notifying the user that they should pay attention to the instructions being provided, as described herein). In certain implementations, such a presentation can be prioritized based on/in response to an identification of (a) the at least one navigation operation that is present in the alternative set of navigation operations and is not present in the projected set of navigation operations, and/or (b) the at least one navigation operation that is present in the projected set of navigation operations and is not present in the alternative set of navigation operations. At 1135, presentation of the navigation application can be deprioritized within the user interface of the device associated with the user (e.g., the referenced navigation application can remain running in the background of the device). In certain implementations, such a presentation of the navigation application can be deprioritized based on a determination that the at least one navigation operation that is present in the alternative set of navigation operations and is not present in the projected set of navigation operations has been performed. At 1140, one or more notifications can be generated. Such notifications can, for example, correspond to the identified at least one of (a) the at least one navigation operation that is present in the alternative set of navigation operations and is not present in the projected set of navigation operations, and/or (b) the at least one navigation operation that is present in the projected set of navigation operations and is not present in the alternative set of navigation operations. At 1145, one or more chronological intervals can be determined, e.g., intervals at which to provide the one or more notifications. Such chronological intervals can include, but are not limited to: a chronological interval prior to initiation of the upcoming trip, and/or a chronological interval subsequent to initiation of the upcoming trip but prior to performance of (a) the at least one navigation operation that is present in the alternative set of navigation operations and is not present in the projected set of navigation operations, and/or (b) the at least one navigation operation that is present in the projected set of navigation operations and is not present in the alternative set of navigation operations. At 1150, the one or more notifications can be provided, e.g., via one or more interfaces of a device associated with the user, such as in a manner described herein. In certain implementations, such notifications can be provided during the referenced chronological interval(s).

By way of further illustration, it can be appreciated that many users commute to and from work each day. They know the route that is typically the best for them and are usually familiar with one or more alternative routes. These users do not typically use a navigation application and/or routing guidance system to help them get to/from work. While these users recognize that such an application/system offers certain advantages (e.g., real-time traffic information), they also recognize that such applications/systems are not designed for the needs of commuters and include many "features" which are not to their liking. They typically choose not to use their application/guidance on commuting trips because the app's/system's poor design for their commuting needs outweighs its benefits.

In certain implementations, the technologies described herein can be configured to provide navigation and other guidance that is specifically designed/directed to the needs of commuters. For example, the described technologies can be configured to provide users with the benefits of real time traffic data without the various shortcomings present in other navigation applications/guidance systems. The described technologies can be configured to run persistently and/or start/stop automatically (e.g., based upon certain events like time of day, day of week, movement, location, etc.). For example, on most days the application/system can run primarily or even fully "in the background", i.e. unnoticeable to the regular user, for example, without any voice, visual and/or haptic instructions/information/signals sent to the user. It can also be configured not to alert its user when she has deviated from her preferred commuting route on the understanding that if the user so did, she did so intentionally. It may be configured not to require its user to turn it on or off—it may do so autonomously or semi-autonomously, e.g., upon the detection of a trip, upon the detection of its presence in a particular mode of transportation. It may be configured not to require its user to input a destination, but to infer/determine such destination (e.g., by learning the user's history or the history of a group of users who have or do not have certain similarities to the user). It may be configured not to use large amounts of battery (e.g., using techniques described herein). By way of further example, on some days, when the user's usual route is not the best route (e.g., there was a crash on the usual route), the application/guidance system can be 'activated' and, for example, alert the user to the new best route (as determined based upon a set of user preferences, like what metric to optimize for (time, distance, cost, etc.) and what modes of transportation to consider (e.g., car only, mass transport only, mixed)). In certain implementations, the described technologies can be configured to alert the user at or near a time that is likely most useful for the user to receive such information (e.g., close to the time at which the user needs to deviate from the usual route to follow today's best route—instead of (or in addition to) at the beginning of the trip or before the trip even begins).

Expressing this concept using terms used elsewhere herein, many or all instructions along the usual commuting route can be considered 'Obvious' (and, for example, 'suppressed'), none or few can be considered Normal and there may be an occasional instruction along the route that is deemed 'Critical' (and perhaps 'Missing' and/or 'Negative').

In certain implementations, upon determining that there is no route that is better for the user than the usual route (e.g., as determined server side), the system may be configured not to check if the user is in a trip and/or on or sufficiently near to the user's usual route.

In certain implementations, if the device location was determined to be sufficiently far away from the usual route, the described technologies may be configured not to check if the user in on the usual route and/or in a trip, e.g., during the minimum time that it could possibly take the user to return to the usual route.

In certain implementations, the described technologies can be implemented at the device. In other implementations, substantially all of the referenced operations can be executed on the server (e.g., it may be useful from a battery standpoint, an internet traffic standpoint and/or from a cost standpoint for one (or a few) devices (e.g., cloud-based servers) to monitor that current optimal routes than for many devices (e.g., mobile devices) to each do this). And, in yet other implementations some of the referenced operations can be executed on the device and some executed on the server.

The above can apply to one or more usual routes (e.g., home to work, work to home, home to parent's house, parent's house to home).

Below is one example of how the system can be configured/operate: Paula's usual route to work is as follows: 1) Make right at end of driveway onto Oak Drive. 2) Make right at end of Oak Drive onto Base St. 3) Make right onto Highway 444. 4) Go 24 km on Highway 444 and take exit 27A. 5) Make right at the light onto Main St. 6) Continue straight for 400 meters until you reach 111 Main Street ("Work"). The system can also determine that Paula starts her usual route to work between 6:00 am and 8:00 (e.g., learned from history, input by Paula). At 6:00, not knowing yet if Paula's in a trip (the system may or may not be able to determine if Paula is in a trip because it may or may not be able to make such determination with sufficiently high accuracy within its battery budget), the navigation application/guidance system (which could be resident on her mobile device(s) and/or fixed in her vehicle and/or in a remote sever), begins monitoring real time traffic information and determines that there is no unusual traffic on her usual route at the moment that could cause such usual route to be sub-optimal for her today (this determination can be made server side so as to reduce battery usage on the device and be made for many users—not just Paula). So, even if Paula is in a trip and on her usual route—it is optimal so there is no reason for the system to interact with her. At 6:30, the system's real-time traffic monitoring component/module can determine that there is an unusual traffic in the region of her commute and/or sufficiently large likelihood at the moment that could cause such usual route to be sub-optimal for her. At such time—and perhaps only if—such real time traffic information shows that there is sufficient likelihood that there is a better route for Paula today (the existence and identity of the better route may be dependent on Paula's current location), the system then determines either (a) if Paula is in a trip (if the system hadn't yet been able to so determine, e.g., because of its battery budget); and/or (b) Paula's current location (also, if the system doesn't know this with sufficient accuracy, e.g., because of its battery budget). Based upon various considerations (e.g., battery level, power connection state, battery costs to make such determinations, time required to make such determinations), the system may choose to determine (a) before (b), or (b) before (a) or, in some cases, the data collected will allow both determinations to be made nearly simultaneously). The device determines that Paula is in a trip and that her location is 20 minutes from the nearest point on the usual route. At 6:50, 20 minutes later, having received no location information and/or trip stop information to delay the earliest possible time at which Paula could have returned to her usual route and given that the real time traffic information continues to show a sufficiently large likelihood that a route other than her usual route may be optimal at present, the system checks and sees that Paula is in a trip and that she is now on the usual route. The system further determines that, based upon her current location, on Highway 444 (as per Instruction 4 above), the optimal route at present for her to reach Work is to leave Highway 444 at Exit 28 (one exit after her usual Exit 27A), and 27 kms from her present location. At 7:10, nothing has changed on the road (i.e., the best route is still different than her usual route) and Paula is now approaching Exit 27A (perhaps 1-2 kms before the exit). The system 'jumps into action' and advises Paula audibly, visually and/or haptically, one or more times (and perhaps with at least one of such instruction being presented farther in advance than instructions are usually presented by a guidance system), that she should not take Exit 27A today, but continue straight to Exit 28. Note that, in this example, this is the first interaction that Paula had with the system today (on many days there will be no user/system interaction at all). The system may now launch a full user interface (UI) on the user's device to help direct the user to her destination along a route less familiar to her.

It should be noted that the described/referenced navigation applications and/or routing guidance systems and the instructions and/or operations provided by them are not limited to any particular mode of transportation—they can apply to cars, trains, buses, boats, bicycles, walking, airplanes etc. They are also not limited to situations in which the user is able to control the navigation (e.g., turn right) of the mode as is the case, for example, when the user is the driver of a car, on foot or a cyclist (on a single-person bicycle)—they can also be applied to situations in which the user is only able to make more limited decisions like to board or de-board (e.g., bus, train).

Navigation applications and/or routing guidance systems provide a user with guidance to take certain actions at certain locations on a route. Such locations can be intersections and the guidance can be how/if to turn at such intersection. Such locations can be bus stops/stations and train stops/stations and the guidance can be what bus line or what train line to board on what track, at what time and in what direction.

The deviations and similarities between (a) a route currently presented to, selected by, and/or autonomously deemed relevant for a user (e.g., as described herein) and (b) one or more previous routes that such user has (and/or other users have) traversed, been presented, selected and/or have provided, can be determined and analyzed. As described herein, the user can be alerted in certain ways (e.g., via certain interfaces) to certain such deviations and the instructions related to certain similarities can be delivered differently (e.g., suppressed or emphasized on one or more UIs).

For example, a user's usual route from home to work is: 1) (Drive) Make a right and continue 1 km to 10th street. 2) (Walk) Continue north to 15th street. 3) (Bus) Board bus N. 4) (Bus) get off at 20th street. 5) (Subway) Enter 20th street subway station and take Subway R uptown on track 2. 6) (Subway) Get off at 30th street. 7) (Walk) Make a right and walk north to 40th street. And today's route is: 1) (Drive) Make a right and continue 1 km to 10th street. 2) (Walk) Continue north to 15th street. 3) (Bus) Board bus N. 4) (Bus) get off at 20th street. 5) (Bus) Transfer to bus Q. 6) (Bus) Get off at 32nd street. 7) (Walk) continue north to 40th street. Today's route deviates from the usual route at Instruction 5 because Subway R uptown is delayed today. These instructions can be classified as obvious (i.e., do not provide such instruction on one or more UIs), critical (i.e., provide such instruction in a more attention grabbing way on one or more UIs, as described herein), missing (i.e., provide an instruction that was not present in the original instruction set), negative (e.g., phrased as a "do not" explicitly or implicitly) and/or corrective (i.e., provide an alert based upon inputs that indicate an increased likelihood that the user will not follow an instructions), all in much the same way that turn-by-turn car navigation instructions are (e.g., as described herein). Depending on various factors (e.g., the user's travel history, the travel history for a group of users), Instructions 1-4 might be classified as obvious instructions and be suppressed on one or more UIs—so as not to overload the user with unnecessary, potentially annoying information. Instruction 5 might be classified as a critical instruction (e.g., a high likelihood of error, a high expected cost of error) and might be delivered using special forms of voice, visual or haptic presentation/delivery so as to increase the likelihood of the user's being aware of and/or complying with them.

FIG. 5 is a flow diagram of a routine that illustrates aspects of one or more methods, such as those described in relation to one or more embodiments described herein. In various implementations, one or more aspects of the referenced method can be performed by one or more hardware devices/components (such as those depicted in FIG. 1), one or more software elements/components (such as those depicted in FIG. 1), and/or a combination of both. At 1210, a first notification instance and a second notification instance, can be generated, e.g., with respect to a navigation instruction. In certain implementations, the first notification instance can include a notification of a navigation instruction to be provided via a first interface and the second notification instance can include a notification of a navigation instruction to be provided via a second interface. At 1220, the first notification instance can be provided, e.g., via the first interface. At 1230, feedback can be received, e.g., with respect to the first notification instance. Such feedback can include, for example, visual feedback, audio feedback, and/or tactile feedback. In certain implementations, one or more visual captures can be processed to determine whether a gaze of a user was maintained with respect to a visual notification provided via the first interface. At 1240, the feedback can be processed. In doing so, it can be determined whether the first notification instance has been acknowledged by a user. At 1250, modifying one or more aspects of a presentation of the second notification instance can be modified (e.g., prevented, adjusted, etc.), e.g., based on a determination that the first notification instance has been acknowledged by a user.

By way of further illustration, it can be appreciated that existing navigation guidance systems often provide navigation instructions redundant with respect to the traveler because the traveler may have already received and/or otherwise understand the instruction being provided. As described herein, the described technologies can determine/identify when such instructions are likely to be redundant and based on such a determination reduce, mitigate, and/or eliminate such redundancy, thereby improving the user experience.

For example, based on a determination that a user (e.g., the traveler) received a visual instruction provided by a device shortly before it needed to be performed, the described technologies can configure the navigation guidance system to refrain from providing a corresponding audio instruction. In another example, based on a determination that a user (e.g., the traveler) heard and/or understood an audio instruction, the described technologies can configure the navigation guidance system to refrain from repeating such audio instruction one or more times as the traveler moves closer to the location at which such instruction is to be provided.

By way of illustration, in certain implementations, the described technologies can utilize various image processing techniques which can includes gaze analysis (e.g., using one or more cameras on the mobile or another mobile device or in-vehicle) to determine whether or not a user is sufficiently likely to have successfully understood/received a particular instruction. For example, such a determination can be made based on the determined location(s) on which the traveler's eyes are determined to be focused (e.g., in the direction of one or more visual interfaces), their variability, and/or the amount of time during which such focus was determined to have been maintained concurrent with the referenced navigation instructions being depicted via the referenced interface (s).

By way of further illustration, in certain implementations, the described technologies can be configured to receive active feedback (e.g., voice, gesture, touch) from the traveler, e.g., to confirm to the system that the instruction was successfully received and comprehended, for example, by speaking "Got It" or by giving a "thumbs-up" gesture or by tapping or swiping on a steering wheel or mobile device. Based on a determination that such feedback has been provided, one or more subsequent prompts/notifications for such instruction(s) can be suppressed.

It can be appreciated that it may be easier and/or less stressful for drivers to drive on roads with which they are familiar. At the same time, drivers often prefer to reach their destinations in the shortest time possible. Accordingly, in certain implementations, the described technologies can be configured to enable a user to balance between these potentially competing interests, e.g., by enabling the defining of a trade-off threshold, ration, etc., e.g., between route familiarity and travel time. Such a configuration can dictate that in order to route (or re-route) a user on a (sufficiently) less familiar route (e.g., as compared to another route that is determined to be more familiar to the user), the expected time savings for such (re-)routing may need to be determined to be sufficiently large (e.g., above a certain threshold, e.g., a time threshold, e.g., 15 minutes, a percentage threshold, e.g., 20% or more longer than the alternative route, etc.). For example, the described technologies can enable a user to configure a navigation application such that the application is not to route the user away from their preferred route (whether prior to the trip start or during the trip) unless such rerouting is determined to be likely to save at least 10 minutes (over the original route).

In certain implementations, various metrics such as the determined distance and/or complexity (e.g., number of turns/instructions) and/or a lowest economic cost of the trip and/or an ecological cost of a trip can be used in lieu of or in addition to the referenced 'shortest time' metric in order to determine whether the increased utility is sufficiently high as compared to the decrease in familiarity (to the user) and/or increase in complexity to justify such a route choice (or re-routing choice), based upon default trade-off threshold or user threshold values provided by the user.

For example, if a user could save 1 minute in reaching her destination by taking a route she has never taken before that included 20 turn instructions on it, relative to a route with which she is very familiar and that has only 3 turn instructions, she would not be routed (or re-routed if determined after a trip has started) to the 1-minute shorter route, but if an alternative route offered a 15 minutes savings on a route with which she is somewhat familiar and which has 5 turns instructions (and this represent a sufficiently utility gain for that user based upon her tradeoff preferences for travel time, familiarity and complexity), she will be routed (or re-routed) to the 15-minute shorter route.

Moreover, in certain implementations directions/instructions provided by SatNav applications to users (e.g., "turn right at the next intersection," etc.) that are actually confusing/ineffective/suboptimal can be determined/discovered. For example, such directions/instructions (e.g., the audio and/or visual prompts that are provided to users while traveling) can be associated with corresponding user actions, such as those that are performed concurrent with/subsequent to the providing of such instructions. Upon determining that concurrent with and/or subsequent to the proving of a particular directions/instruction (or set of directions/instructions) by a SatNav application, one or more users (e.g., relatively more users than is typical/average) can be determined to navigate in a manner that deviates from the instructions provided by the application (as can be determined, for example, as an instance of 'rerouting' by the application, for example based on the user making a 'wrong turn'), it can be further determined that such a direction/instruction is relatively likely to be confusing/unclear to users, and such a direction/instruction can be flagged for improvement and/or provided to the appropriate road authorities in charge, for example, to evaluate/change the signage, evaluate/change the infrastructure, etc. Moreover, in certain implementations having identified such locations, instructions, operations, etc., as being relatively confusing, unclear, etc., a 'special instruction' can be generated and provided to all users or specifically to those users who are determined not to be sufficiently familiar with such location, instruction, operation (as determined, for example, based on the number of previous visits, the timing of those visits, the transportation mode and/or the in-vehicle role of the user during those visits), such as in a manner described herein. For example, a notification such as "Be careful! You are approaching a tricky location at which many people make errors. In 400 m you must turn left—be careful not to take the tunnel" can be generated and provided. Additionally, in certain implementations such an instruction/notification can be provided via one or more interfaces, at a different intensity, etc., such as in the manner described herein.

FIG. 6 is a flow diagram of a routine that illustrates aspects of one or more methods, such as those described in relation to one or more embodiments described herein. In various implementations, one or more aspects of the referenced method can be performed by one or more hardware devices/components (such as those depicted in FIG. 1), one or more software elements/components (such as those depicted in FIG. 1), and/or a combination of both. At 1310, a benefit to be realized by a user can be determined, e.g., with respect to utilization of a first travel route in lieu of a second travel route. Such a benefit can include, for example, an expected (or actual) time savings to arrive at a destination, distance reduction, cost reduction, safety improvement, beautification, etc. to be realized or received by a user. In certain implementations, such a benefit can be determined before, during or after the travel occurs. In certain implementations, the benefit can be determined through the use of inputs from one or more of (i) the user's vehicle, (ii) a mobile device and (iii) extra-vehicle means. Additionally, in certain implementations the benefit can be positive or negative and the transaction parameters can be adjusted in favor or in disfavor of the user, as described herein. Additionally, in certain implementations the referenced benefit can be based on any number of criteria. For example, such a benefit can be computed based on/with respect to one or more trip efficiency metrics such as a distance (e.g., miles/kilometers traveled), a fuel efficiency metric (e.g., amount of gas or electricity expended), a time interval (e.g., a number of minutes/hours), and/or any other such metric or quantity that can reflect or quantify one or more aspects associated with a trip. At 1320, one or more transaction parameters associated with utilization of the first travel route can be adjusted, e.g., based on the determined benefit. For example, a toll charge associated with utilization of the first travel route can be adjusted (e.g., raised or lowered) in accordance with the determined benefit to be realized by the user in utilizing the first travel route.

By way of further illustration, in many locations, a driver can elect to take or not to take a toll road based upon a fixed price. In some locations, the price of the tolls is dynamic, e.g., based upon a time savings metric when compared, considering real time traffic, to an alternative free route. In both models (static price and dynamic pricing), the price is one size fits all—that is, users can either take the toll road and pay—or not. However, it can be appreciated that different drivers may derive different benefits (e.g., time savings) from using toll roads—even if they drive the same distance on such roads (e.g., same entrance and exit from the toll road). For example, one driver may reduce her travel time by 5 minutes by taking a toll road and another by 25 minutes by taking the same toll road and, in some cases, even entering and exiting at the same exits. Nevertheless, existing technologies charge both drivers the same toll for access to the referenced road. Accordingly, toll roads may lose those customers for which the benefits of the use of such road are determined to be small relative to the toll's cost. Accordingly, by charging drivers/vehicles based (in part or entirely) upon a determined individual benefit to the user (e.g., as determined based on inputs originating from a mobile device, an in-vehicle application, a vehicle-to-infrastructure (V2X) communication and/or a customer declaration), the described technologies can enable such toll road prices to be personalized and/or dynamically adjusted in relation to a determined benefits to a driver and/or passenger(s) (whether expected benefit and/or actual benefits, e.g., on a particular trip).

For example, if by taking a certain toll road (I-95) from Exit 1 to Exit 3, Driver A, who saves 5 minutes (based on traffic on a particular day/time or on average for that day/time or on average across days and time) in reaching her destination (e.g., her work place as is determined based on inputs originating at her mobile device or vehicle) may be likely to pay up to $2.50 (i.e., $0.50 per minute) in lieu of, for example, a fixed cost of $7.50 while Driver B, who saves 25 minutes in reaching his destination may be likely to pay up to $12.50 in lieu of the $7.50 fixed cost. In another example, the toll price can be set at $1.50 plus $0.40 per minute saved, i.e., $3.50 for Driver A and $11.50 for Driver B.

Figure 8:
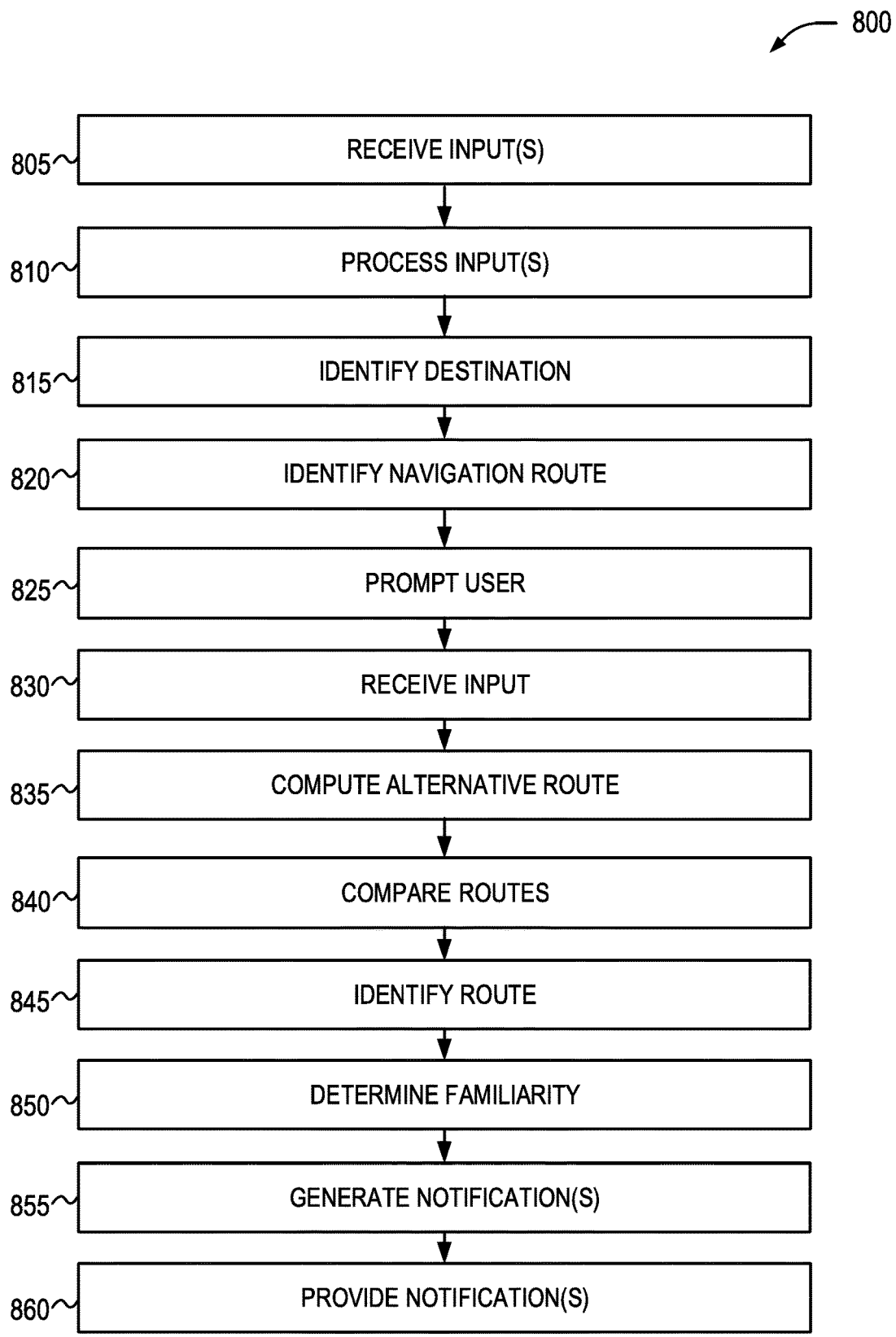

FIG. 8 is a flow chart illustrating a method 800, according to an example embodiment, for enhanced navigation instruction. The method is performed by processing logic that can comprise hardware (circuitry, dedicated logic, etc.), software (such as is run on a computing device such as those described herein), or a combination of both. In one implementation, the method 800 is performed by one or more elements depicted and/or described in relation to FIG. 1, while in some other implementations, the one or more blocks of FIG. 8 can be performed by another machine or machines.

For simplicity of explanation, methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

At operation 805, one or more input(s) are received. In certain implementations, such input(s) can include inputs that reflect a connection, disconnection, etc. of a device, from a network access point, cell tower, peripheral device, etc. For example, such input(s) can correspond from a disconnection of a device from a Wifi access point, which can reflect that a user has left his/her home. Such inputs can also include various motion inputs (e.g., originating from an accelerometer of a device), reflecting that the user is not in a car or otherwise in motion.

At operation 810, the input(s) (e.g., those received at 805) are processed. In certain implementations, such input(s) are processed to determine a navigation initiation instance, e.g., with respect to the device. Such a navigation initiation instance can reflect that the user has started a trip. In certain implementations, such a navigation initiation instance can be determined based on various factor such as the time of day, week, month, etc., a navigation history associated with the user and/or other users, and/or subsequent inputs (e.g., motion inputs), as described herein.

By way of further illustration, in certain implementations, the guidance and/or other notifications described herein can be generated and/or provided to the user when requested by the user (e.g., via in-app request, voice request). In other implementations, the referenced guidance can be provided based on/in response to a determination that certain events have occurred, e.g., on a device associated with the user. Such events can include, for example, a time-based event (e.g., 7 am on a weekday), a motion-based event (e.g., sensor movement indicative of vehicular movement), an RF-based event (e.g., perceiving certain RF signals or seeing certain changes in the RF signals perceived), a location-based event (e.g., indicating that the device has changed location), an environmental-based event (e.g., changes in environmental sensor values indicating a change in environment), as determined using the user's settings (e.g., commute days and times) and/or sensors (e.g., motion sensors, RF radios, environmental sensors).

For example, at 8 am the smartphone device associated with a user can determine or record that she has disconnected from her home WiFi access point and, shortly after, determines that she is likely in a vehicle (e.g., based on various inputs originating from the device's motion sensors). Based on such a determination, the described technologies can compare the time to travel from her current (or recent) location ('A') to 'B' (which can be her most common destination in general or under various conditions which currently exist, e.g., departing from 'A' at a certain time, day of week, etc.) or the destination she input in settings. The described technologies can then guide the user via one or more interfaces (e.g., voice, visual, haptic, etc.) as to whether she should follow her usual route or take a better/more optimal route, as described herein.

At operation 815, a navigation destination is identified, predicted, and/or projected. In certain implementations, such a navigation destination can be identified based on the navigation initiation instance (e.g., as identified at 810), which can reflect, for example, the likely destination to which a user is traveling, e.g., as determined based on time of month, etc., a navigation history associated with the user and/or other users, and/or subsequent inputs (e.g., motion inputs), as described herein.

In some implementations, the user's start location, A, and/or destination, B and/or intended route, R, are provided explicitly by the user (e.g., manually, on-the-fly at or near the start of a trip or via automatically via settings). In other implementations, such locations, destination, routes, etc., can be determined, computed, predicted, etc. (e.g., based upon the travel/data history of the user or a group of users, recent location/sensor trip detection techniques such as those described herein).

Figure 9A:
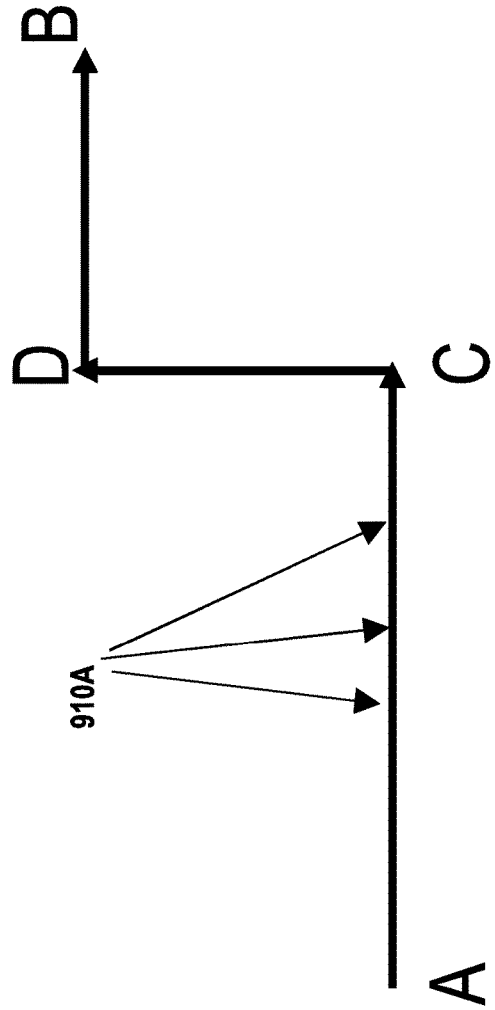
FIGS. 9A-18 illustrate example scenarios described herein, according to example embodiments.
Figure 9B:
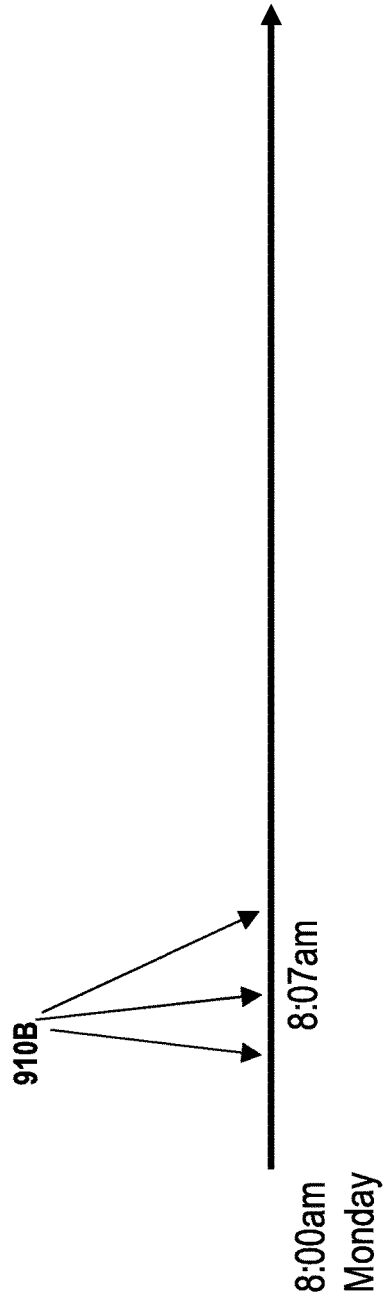

For example, if a user is determined to travel on most weekday mornings at around 8 am from A to B, where the first part of such trip is usually via train, the current time is 8:07 on Monday and using the sensors on her device it is determined that she is travelling by train (e.g., based on sensor input(s) received at points 910B, as shown in FIG. 9B) and she is in a location (and has recently been in other locations) that is along her usual route from A to B (see FIG. 9A), her destination and her current route can be determined/projected to be her usual route from point A to point B via points C and D (e.g., as determined based on inputs corresponding to location(s) 910A as shown in FIG. 9A. Corresponding notifications, guidance, etc. can then be generated and provided to the user, e.g., via one or more interfaces. In some cases, the user may be asked to confirm and/or clarify her intent.

At operation 820, a navigation route is identified. In certain implementations, such a navigation route can reflect or correspond to various navigation operations performed by one or more users, e.g., when traveling to/from certain location(s). Such a navigation route can be, for example, the common route taken by a user to a particular destination at a specific time of day. In certain implementations, such a navigation route can be identified based on the identified navigation destination (e.g., at 815). For example, upon determining that a user is likely to be traveling to a particular destination, as described herein (e.g., upon determining the user left his/her house at 8:00 am on Monday morning, it can be further determined that the user is likely traveling to his/her office). Accordingly, having identified such a navigation destination, the described technologies can identify a route that the user is likely to travel to arrive at such a destination (e.g., the user's commonly traveled route to his/her office). In certain implementations, such a navigation route can be a navigation route associated with the device and/or the user, e.g., as determined based on time of month, etc., a navigation history associated with the user and/or other users, and/or subsequent inputs (e.g., motion inputs), as described herein.

Figure 10:
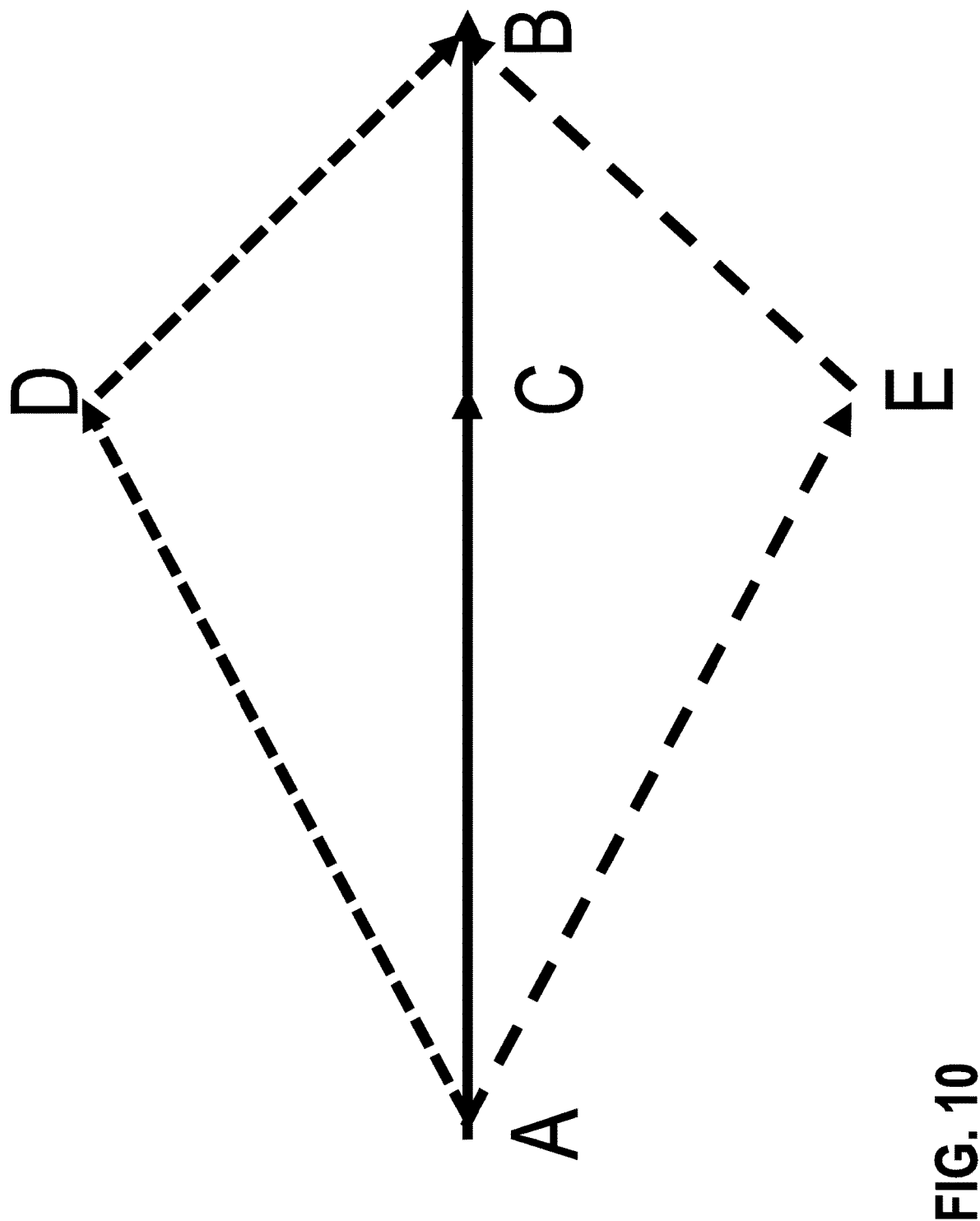

In certain implementations, the referenced navigation route can be associated with one or more identifiers, labels, etc. For example, in certain implementations, various user routes can be labeled (e.g., by the user, by a group of users, by algorithmic geographic rules). Such labels can be used to convey information and/or instructions to the user in a more natural way. For example, as shown in FIG. 10, the user's primary route, ACB, is labeled the "Lincoln Tunnel", one of the user's secondary routes, ADB, is labelled the "Holland Tunnel" and another secondary route, AEB, is labelled the "George Washington Bridge". When generating notifications, alerts, etc., to provide to the user, such notifications can utilize or reference these labels. For example, instead of providing a notification instructing the user to "take your usual route", such a notification can indicate "take the Lincoln Tunnel". And, if the George Washington route is better today, such a notification can indicate "Take the George Washington Bridge" or, "take the bridge", or "take the bridge instead of the tunnel today."

At operation 825, a user can be prompted. In certain implementations, the user can be prompted with respect to the navigation destination and/or the identified navigation route. For example, having identified/determined that a user is likely to be traveling to a particular destination (e.g., to the office) and/or traveling along an identified navigation route (e.g., their commonly traveled route), the user can be prompted to confirm various aspects of the referenced determinations. For example, the user can be prompted with a notification via their device inquiring "Are you traveling to the office now?" "Are you taking your usual route to the office?" etc. The user can then provide a response/input in to confirm, correct, etc., the referenced determination(s).

At operation 830, an input from the user is received (e.g., via the referenced device). In certain implementations, such an input can be received in response to the referenced prompting (e.g., at 825). In certain implementations, such an input can correspond to the referenced navigation destination (e.g., as identified at 815) and/or the navigation route (e.g., as identified at 820). For example, the user can provide input(s) (e.g., selections on a touchscreen, voice commands, etc.) in response to prompts such as "Are you traveling to the office now?" "Are you taking your usual route to the office?" etc. Such inputs can, for example, confirm, correct, etc., the content of the referenced prompt(s) (e.g., 'Yes, I am traveling to the office," "No, I'm going to the airport," etc.).

At operation 835, an alternative route is computed. In certain implementations, such an alternative route can be computed based on a current location of the device and/or the identified navigation destination (e.g., as identified at 815). Such an alternative route can be computed based on various factors such as current/predicted traffic conditions, etc.

In certain implementations, such an alternative route can be associated with one or more identifiers. Such identifiers can correspond, for example, to one or more navigation operations included in the computed alternative route. For example, as described herein, a particular route (e.g., a sequence of navigation operations from one point to another) can be described or referenced with respect to a particular operation, street name, landmark, etc. Such an identifier can be, for example, an operation (e.g., 'take the Lincoln Tunnel') that is particularly prominent or significant during the route, and/or which distinguishes the route from alternative routes (e.g., 'take the George Washington Bridge'). As noted, in certain implementations such identifiers can utilize common terminology to generate notifications that reference such identifiers (e.g., 'Take the Tunnel,' 'Take the Bridge,' etc., which can be understood by users in certain locations and/or traveling on certain routes to refer to specific landmarks, operations, etc.).

At operation 840, the identified navigation route (e.g., as identified at 820) can be compared with the computed alternative route (e.g., as computed at 835). In doing so, various respective navigation operations included in the identified navigation route (e.g., the route the user commonly takes to a particular destination, the route the user is currently determined to be taking to the destination, etc.) can be compared with navigation operations included in the computed alternative route, such as in a manner described herein.

At operation 845, the alternative route (e.g., as computed at 835) can be identified as preferable to the identified navigation route (e.g., as identified at 820). In certain implementations, various criteria can be defined with respect to which one route can be determined to be preferable to another. Examples of such criteria include but not limited to various user preferences, such as may reflect a preference of a user for traveling via a router determined to be fastest, shortest, cheapest, prettiest, safest, (e.g., as compared to other identified routes). Additionally, in certain implementations the referenced alternative route can be determined to be preferable to the identified navigation route in relation to a defined threshold (e.g., with respect to the referenced criteria). By way of illustration, such a threshold can reflect that an alternative route is to be identified as preferable (e.g., with respect to taking further action such as alerting a user to change or deviate from his/her current route) in a scenario in which the alternative route is determined to be preferable to the navigation route beyond a defined threshold, e.g., 20% faster, five or more minutes faster, five dollars or more cheaper, etc.

Figure 11:
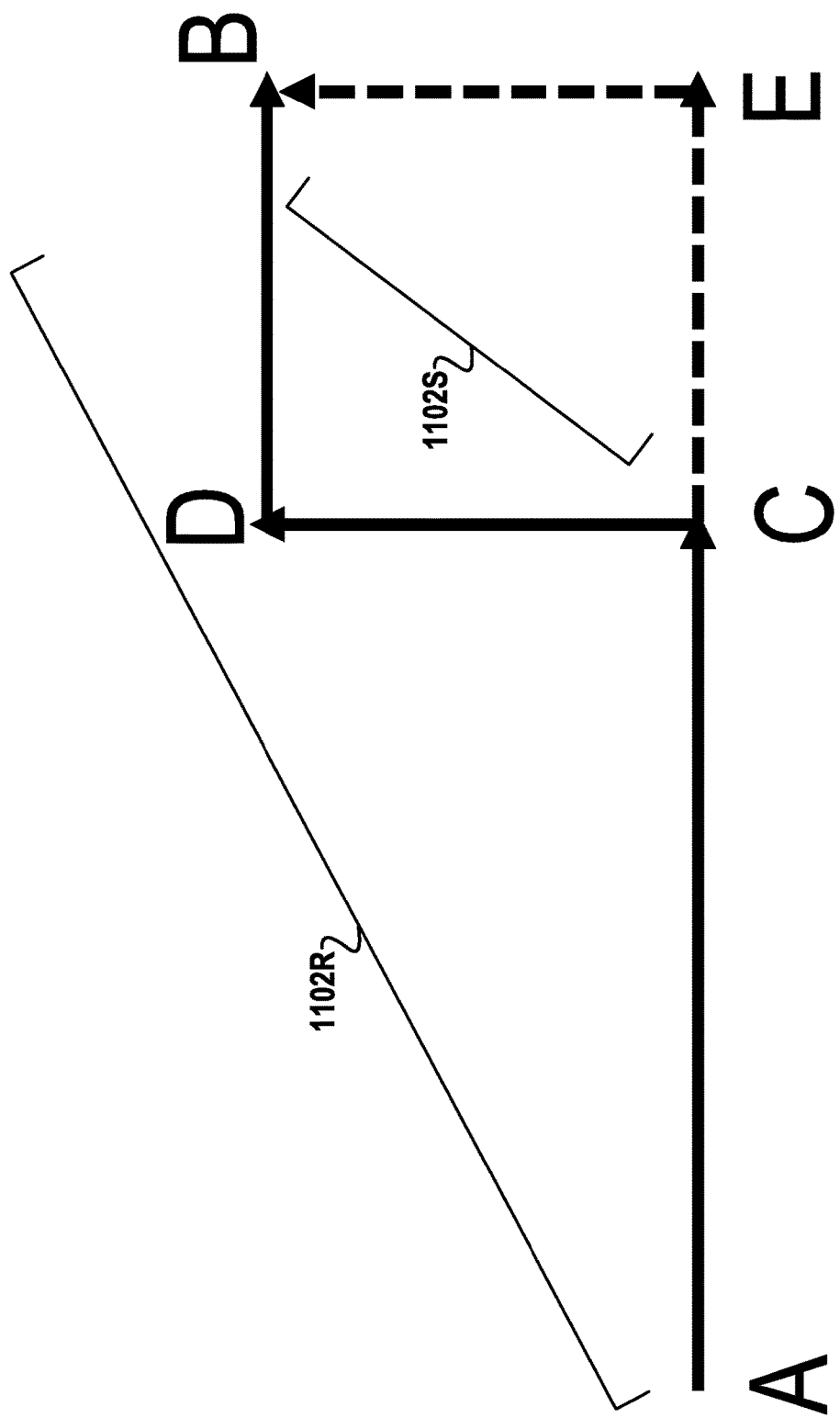
Figure 15:
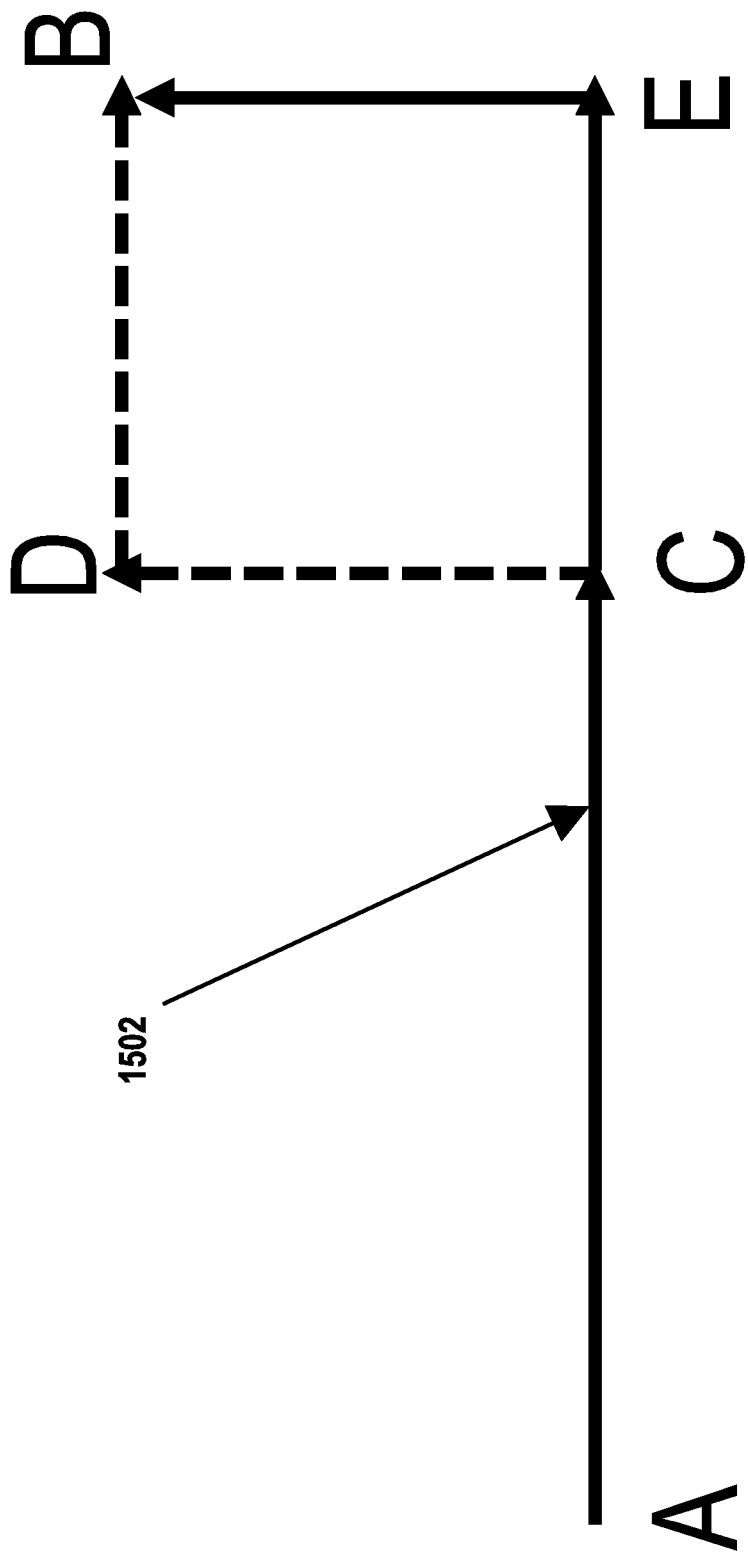

By way of further illustration, in some implementations, the described technologies can compute and provide notifications, guidance, etc., with respect to which a traveler's usual route is the best/optimal route at a certain time. For example, in the scenario depicted in FIG. 11, the described technologies can compute whether a traveler's usual route (route '1102R,' as shown in FIG. 15, from location 'A,' to destination 'B' via points 'C' and 'D') is the best or optimal route (e.g., for this user or for some group of users to take). As noted, such a navigation route can be compared to a computed alternative route, such as route 1102S, from location 'A' to destination 'B' via points 'C' and 'E,' as shown in FIG. 11. As also described here, in certain implementations determining the best or optimal route can be computed, for example, based on her/their preferences for the fastest, shortest, cheapest, prettiest, safest, etc. route. Additionally, in certain implementations the referenced determination (with respect to the best or optimal route) can be computed with respect to a certain time (e.g. now, later) and can further account for the traffic conditions at such time (e.g., actual, predicted, average). By way of further illustration, in certain implementations a currently optimal navigation route can be identified and such an identified route can be compared with a route associated with a user (e.g., the user's preferred/usual route)

Figure 12:
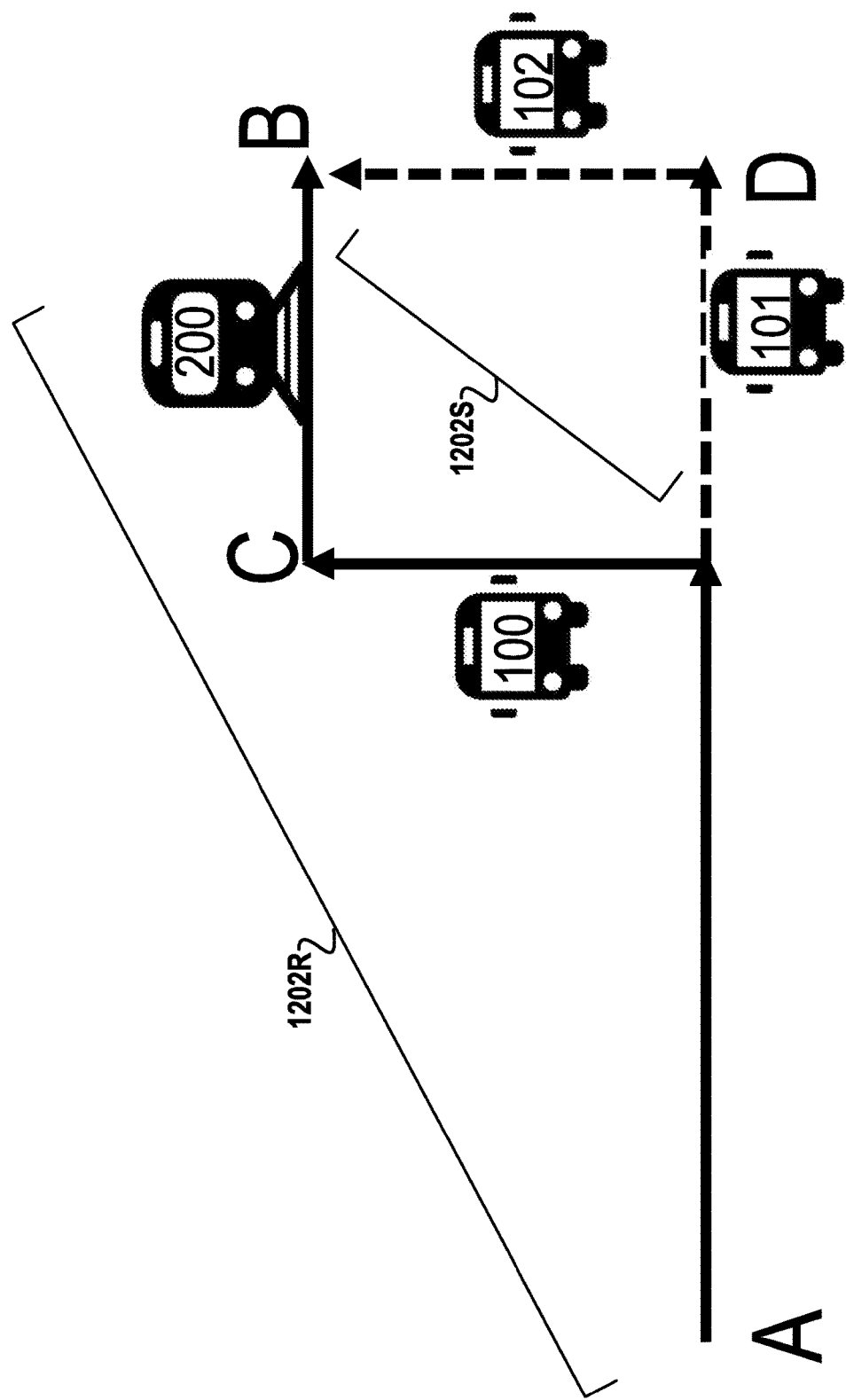

In a scenario in which the described technologies compute or determine that the best/optimal route is better (or likely to be better) than the user's usual route (e.g., by more than a threshold amount), various actions can be initiated or taken, e.g., to notify and/or otherwise help the user take advantage of this information. By way of illustration, a push notification can be provided to the user, the user's preferred navigation application can be launched on her mobile device and/or in her vehicle, etc. This guidance may be in lieu of some, or all, of the guidance (e.g., turn-by-turn, bus/train number) provided by navigations applications. By way of further illustration, based on a determination that a currently optimal navigation route exceeds a performance threshold (e.g., is more than 5 minutes faster than the user's usual route, as described herein), an action can be initiated with respect to the user (e.g., launching a navigation application at the user's device, providing a notification By way of further example, as shown in FIG. 12, a notification or guidance is provided to traveler at 8 am today that there is a better route available to her. In the depicted scenario, the user's usual route 1202R from home to work (in which she travels via Bus '100' from 'A' to 'C' and then travels via Train '200' from 'C' to 'B') is estimated to take 60 minutes. In contrast, alternative route 1202S in which she travels via Bus '101' from 'A' directly to 'D' and the via Bus '102' from 'D' to 'B' is estimated to take only 45 minutes. In the depicted scenario, the referenced 15-minute time savings is above the 5-minute time-savings threshold that the user can define or require to be exceeded before she is notified that a better (e.g., faster) route exists. Accordingly, in the depicted scenario the user can be notified of the better route, e.g., in a manner described herein.

At operation 850, a degree of familiarity is determined, e.g., a degree of familiarity of a user with the alternative route (e.g., as computed at 835).

Figure 13:
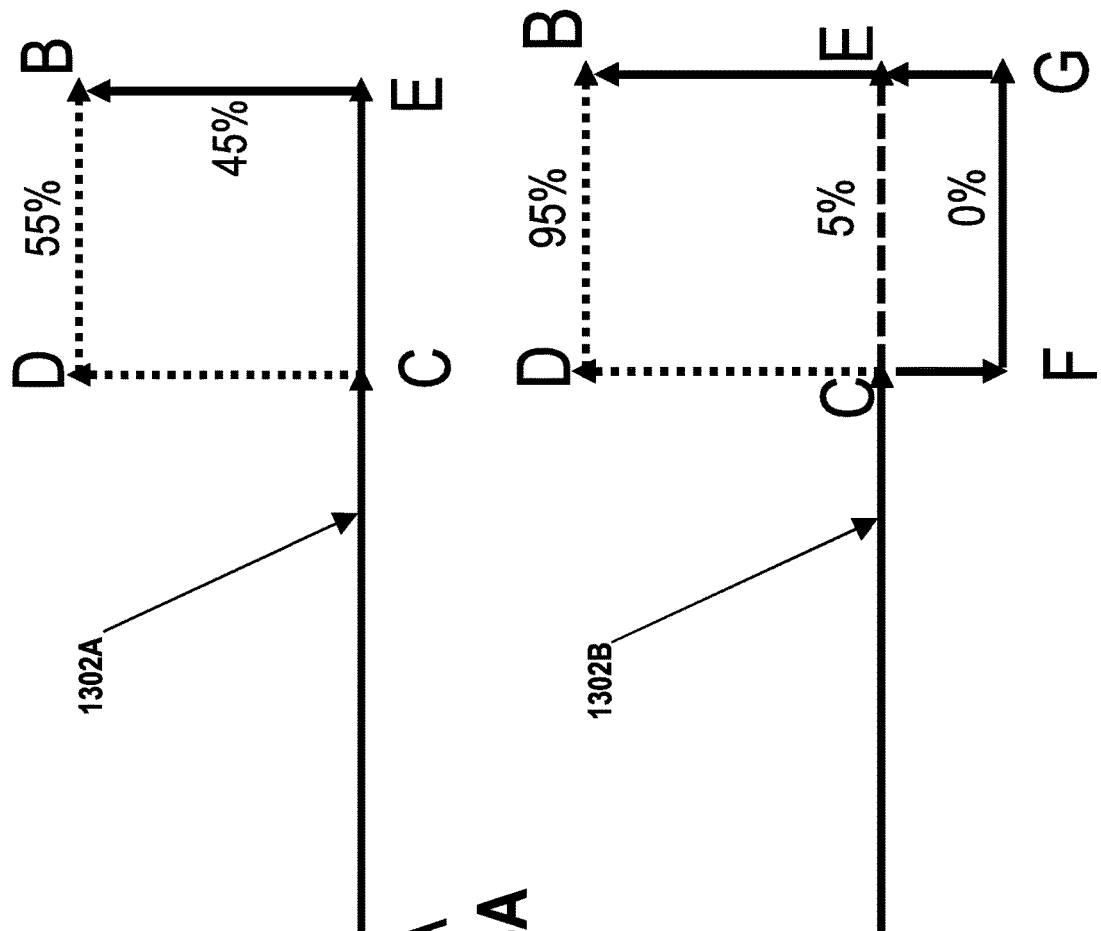

In some implementations, after the user deviates from her usual route in favor of a better route (or, perhaps, in error), regular instructions/notifications (e.g., turn-by-turn, mode and line number, as generated by a navigation application) are provided. In some implementations, the determination as to whether to provide such instructions on a better route/mode can depend on the user's determined familiarity with the better route/mode. For example, as shown in FIG. 13A, if the user is determined to take her usual route from A to B (A-C-D-B) 55% of the time and today's better route (A-C-E-B) the remaining 45% of the time, full turn-by-turn instructions are not provided for the better route, in view of the user's determined familiarity with the alternative route. In such a scenario, the user can, for example, be provided with a single instruction/notification at point 1302A, reflecting that the user should continue straight, past point 'C,' and then turn at point 'E.' However, in the scenario shown in FIG. 13B, if the user takes her usual route from A to B (A-C-D-B) 95% of the time and has never taken part, or all, of the current best route (A-C-F-G-E-B), full turn-by-turn instructions (or other such notifications) can be generated and provided for the entire route, and/or for the portion of the route determined not to be familiar/previously traveled by the user (C-F-G-E-B). In such a scenario, the user can, for example, be provided with an instruction/notification at point 1302B, reflecting that the user is to take an alternative route, followed by specific (e.g., turn-by-turn directions) for portions of the route determined not to be familiar to the user (e.g., above a defined threshold). In doing so, the user's degree of familiarity with segment(s) of a route can be accounted for in determining which notifications, instructions, etc. to provide (or not to provide) to a user.

At operation 855, one or more notifications are generated, as described herein. In certain implementations, such notifications are generated based on the determined degree of familiarity (e.g., as determined at 850). In certain implementations, such notifications can include instruction(s) that correspond to aspects of the alternative route e.g., as computed at 835). For example, as noted, in certain implementations certain navigation instructions that correspond to portions of a route determined not to be familiar to a user (e.g., above a defined threshold) can be identified. Various types of notifications, e.g., turn-by-turn instructions, can be provided to a user with respect to such operations (e.g., via various interfaces, as described herein).

Additionally, in certain implementations the referenced notifications can include instructions that correspond to or reference aspects of the identified navigation route (e.g., as identified at 820). For example, in certain implementations the referenced notifications can reference aspects of the identified navigation route, which can be, for example, a route the user commonly travels. By way of illustration, a notification can instruct a user not to take their usual route (and/or one or more operations that make up such a route), and rather to take an alternative route, as described herein.

At operation 860, the notification(s) (e.g., as generated at 855) are provided, e.g., via one or more interfaces of the device. In certain implementations, such notifications can be provided in relation to various inputs received from the user (e.g., at 830). For example, upon receiving an input confirming that a user is traveling to a particular destination, various notifications can be generated and provided, as described herein.

Figure 14:
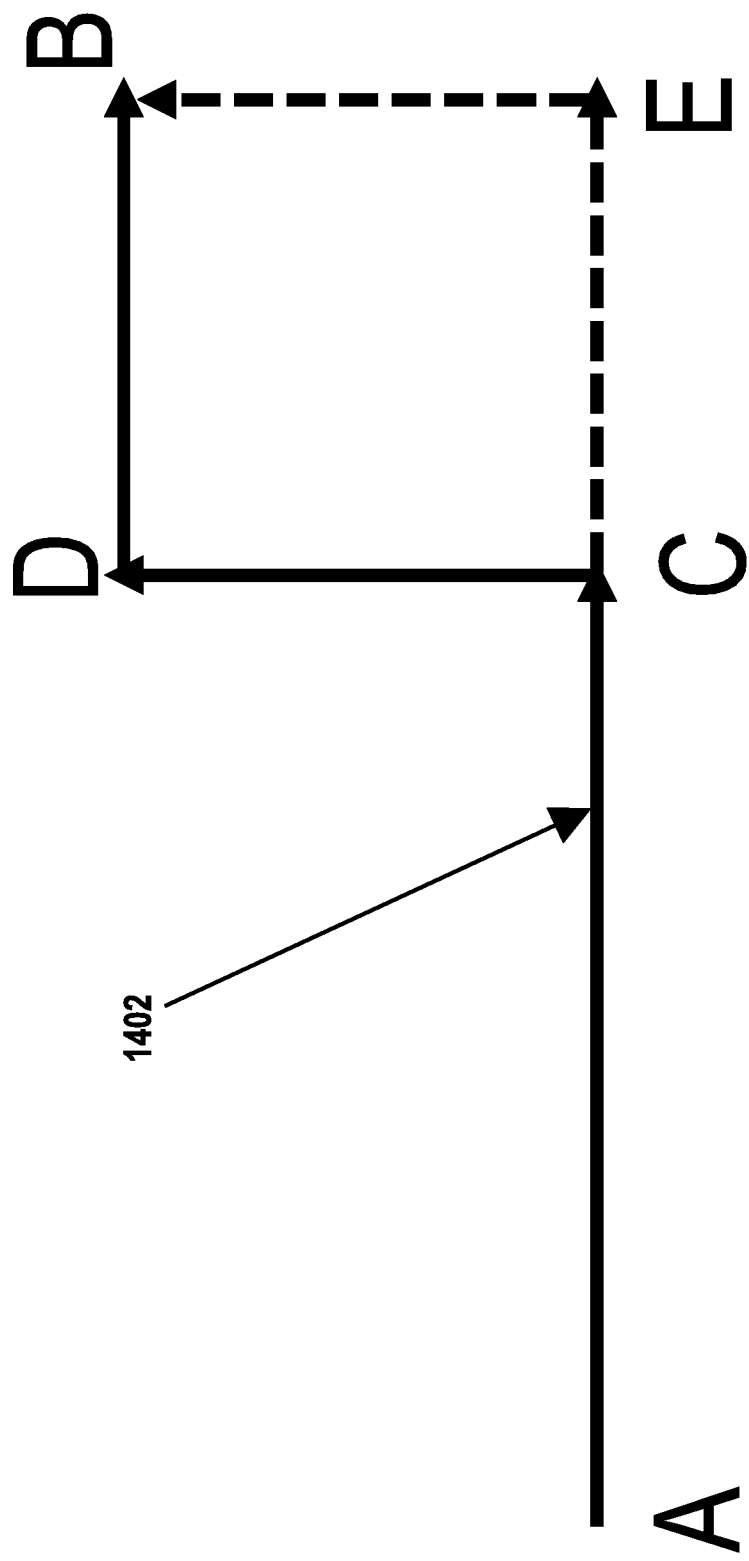

In some implementations, the existence of a better route can be determined or computed repeatedly (e.g., continuously, from time-to-time), before, or while, the user is traveling along the route. Additionally, various additional user guidance notifications and/or actions can be taken/performed as appropriate (e.g., updated, revised, modified, corrected). For example, as shown in FIG. 14, after a notification is provided to the user to begin her usual route (A-C-D-B), and the user begins the route, as she approaches point 'C' (e.g., when the user is located at point 1402) the described technologies determine that another route (C-E-B) is presently better/faster than a portion of the user's original/usual route (C-D-B). Based on such a determination, a notification can be provided to the user (e.g., at or near point 1402), instructing the user to deviate towards point 'E' instead of continuing her usual route toward 'D.'

By way of further example, as shown in FIG. 15, notification is provided to a user at or near the start of her trip to deviate from her usual route (A-C-D-B) and to take another route (A-C-E-B) instead. But, by the time she approaches point C (e.g., when the user is located at point 1502), conditions have changed (e.g., a crash on segment E-B), in such a way that route C-E-B is now no longer sufficiently better for the remainder of her journey than CDB, whereupon a notification is provided to take her usual route C-D-B.

The described monitoring and/or the determination of better routes (as described herein) can be implemented device-side (e.g., each device pulls traffic/delay information from time to time) and/or server-side (where traffic/delay information is monitored and updated as "pushed" to devices as appropriate).

In certain implementations, the user's usual route 'R,' from A or B, can be set in different ways. For example, such a route can be (i) input by the user in user settings; (ii) learned or determined from the user's travel history (e.g., based on location tracking data); (iii) learned from the travel history of a group of others; (iv) assumed to be route that is usually optimal (e.g., most often during the day, during the times at which the users travels, at the current time) according to metrics chosen by the user (e.g., fastest, shortest etc.).

In some implementations, more than one user route is set. For example, a primary or usual route and secondary routes can be set. By way of illustration, the route ACB can be set as the primary route with ADB and AEB set as secondary routes.

Figure 16:
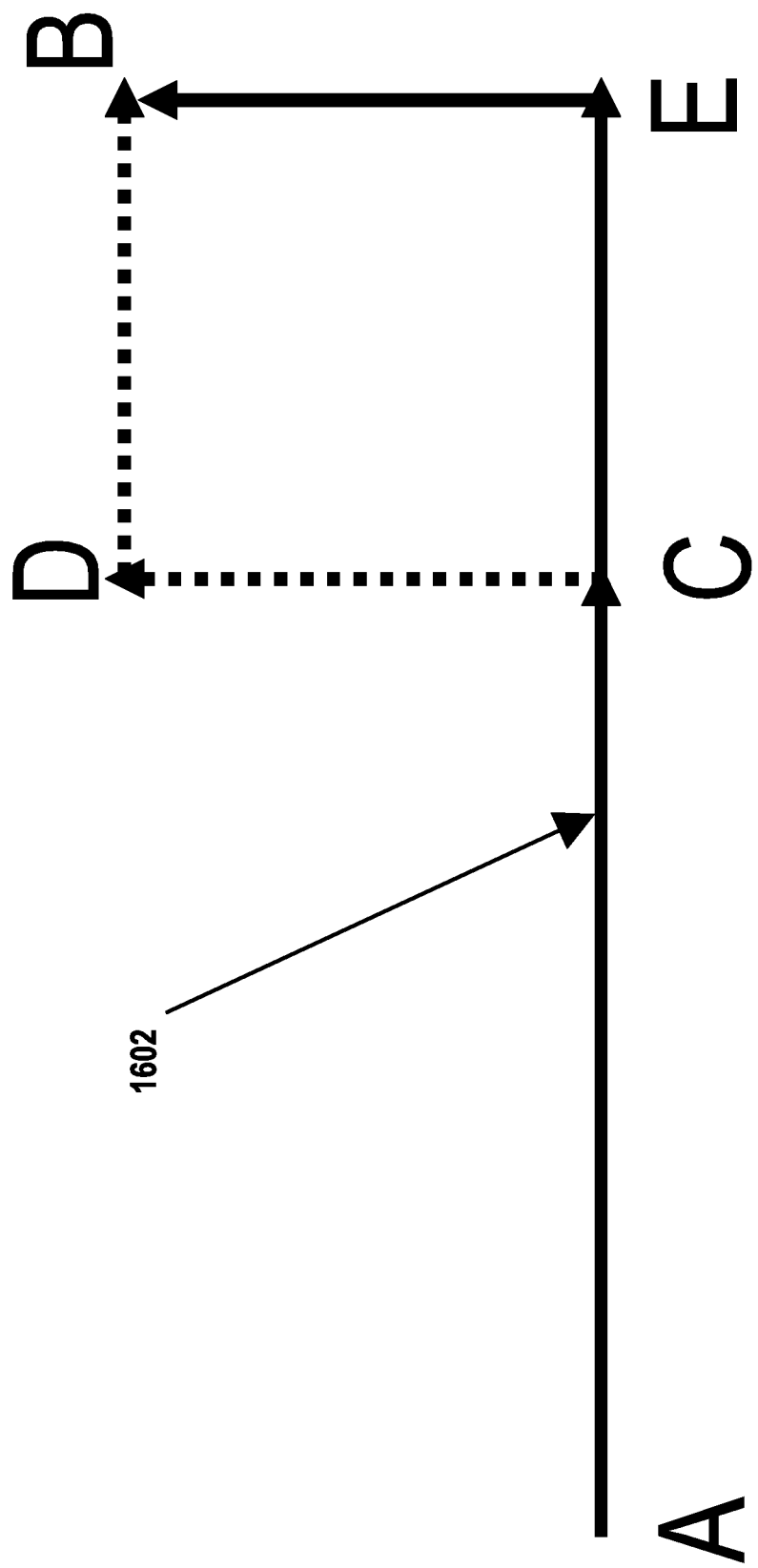

In some implementations, the described technologies can provide notifications and/or otherwise alert the user to (or reminded the user of) the existence of a better/optimal route (e.g., via notification or launching a navigation application) at one or more specific times (e.g., before or around the start of the trip, as user approaches point of deviation between usual and today's best route). For example, as shown in FIG. 16, at or near the beginning of a trip, the user is alerted the route A-C-E-B is currently 15 minutes faster than her usual route, A-C-D-B. As she approaches point C (the point at which the current best route deviates from her usual route) a notification can be provided to the user (e.g., at location 1602, as shown in FIG. 16, for example "continue straight" or "don't turn left"), advising/reminding the user (e.g., with emphasis) via one or more interfaces, to proceed (e.g., turn, continue straight, take bus X, take train Y) in the direction of point E, to help prevent her from accidentally taking her usual route and/or mode of transportation by force of habit.

Figure 17:
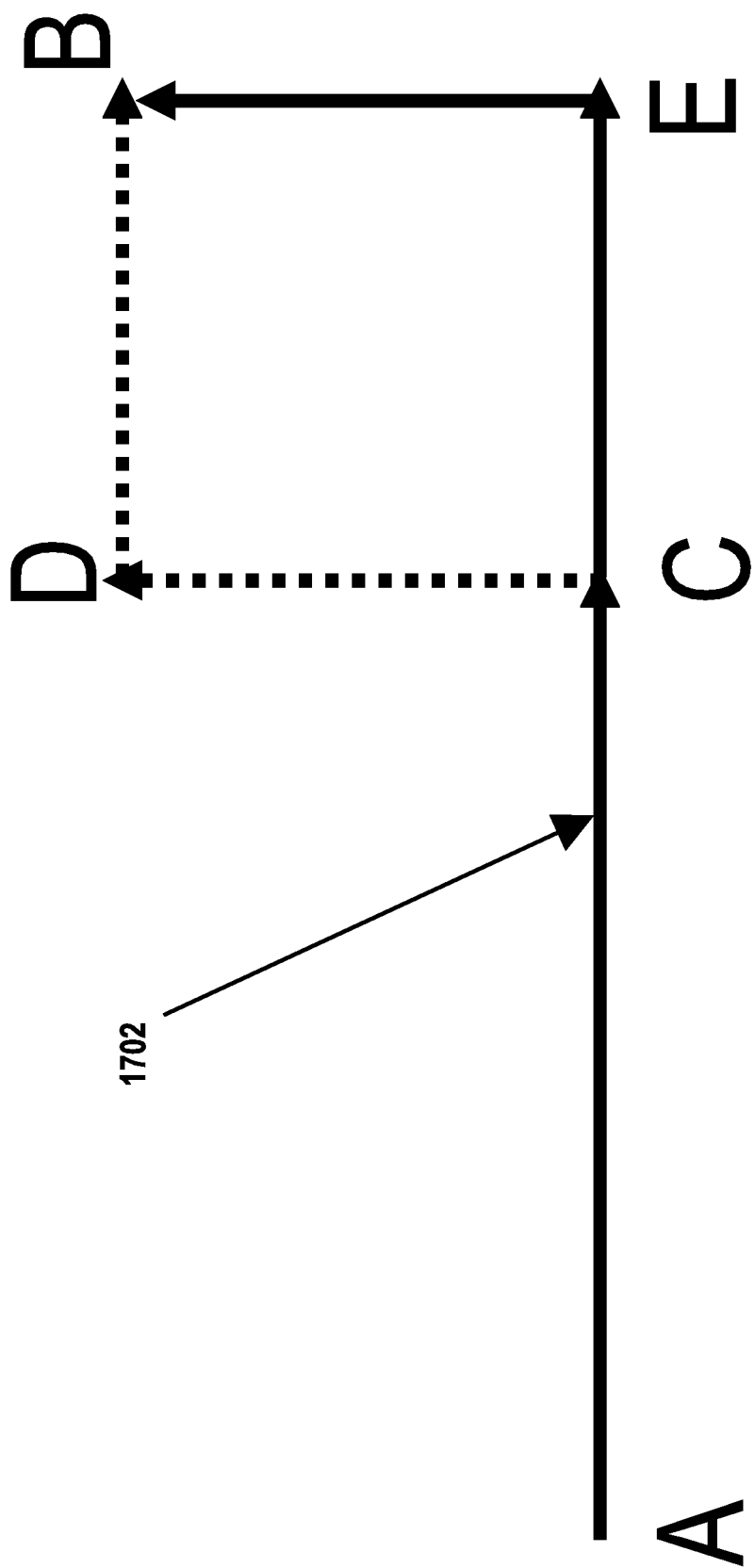

In some implementations notifications/guidance (e.g., "take your usual route/mode of transport", guidance to take a better route/mode of transport with or without targeted instructions around the point of deviation between the usual route/mode and the currently better route/mode) can be provided in lieu of some, or all, of the notifications/instructions that a navigation application may otherwise provide to its user (e.g., turn-by-turn instructions, mode and line number instructions). For example, as shown in FIG. 17, because route A-C-E-B (a route determined to be the best route and determined to be familiar to the user) deviates from A-C-D-B (a route determined to be the user's most common route, but not currently the best route), one or more turn or mode/line instructions are given via one or more interfaces as she approaches point C (e.g., at location 1702, as shown in FIG. 17, for example "continue straight" or "don't turn left") and, because A-C-E-B is known to the user, there are no other instructions given (e.g., at certain interfaces or on all interfaces).

In certain implementations, the described technologies can be configured to determine (or receive) a traveler's/ user's level of familiarity with a route to be travelled (e.g., based on historical data or user-provided data). Based on such a determined level/degree of familiarity, the described technologies can adjust various aspects of the level of instruction provided to the traveler, e.g., based on her familiarity with the route. For example, the greater the user's familiarity with the route, the lower the level of instruction that can be provided (e.g., fewer instructions, only "important" instructions, fewer repetitions, delivery via fewer interfaces, lower volume, less verbose, lower priority to interrupt/override other activities). Conversely, the lower the user's determined familiarity with a route, the higher the level of instruction (e.g., more detailed, louder, etc.)

Figure 18:
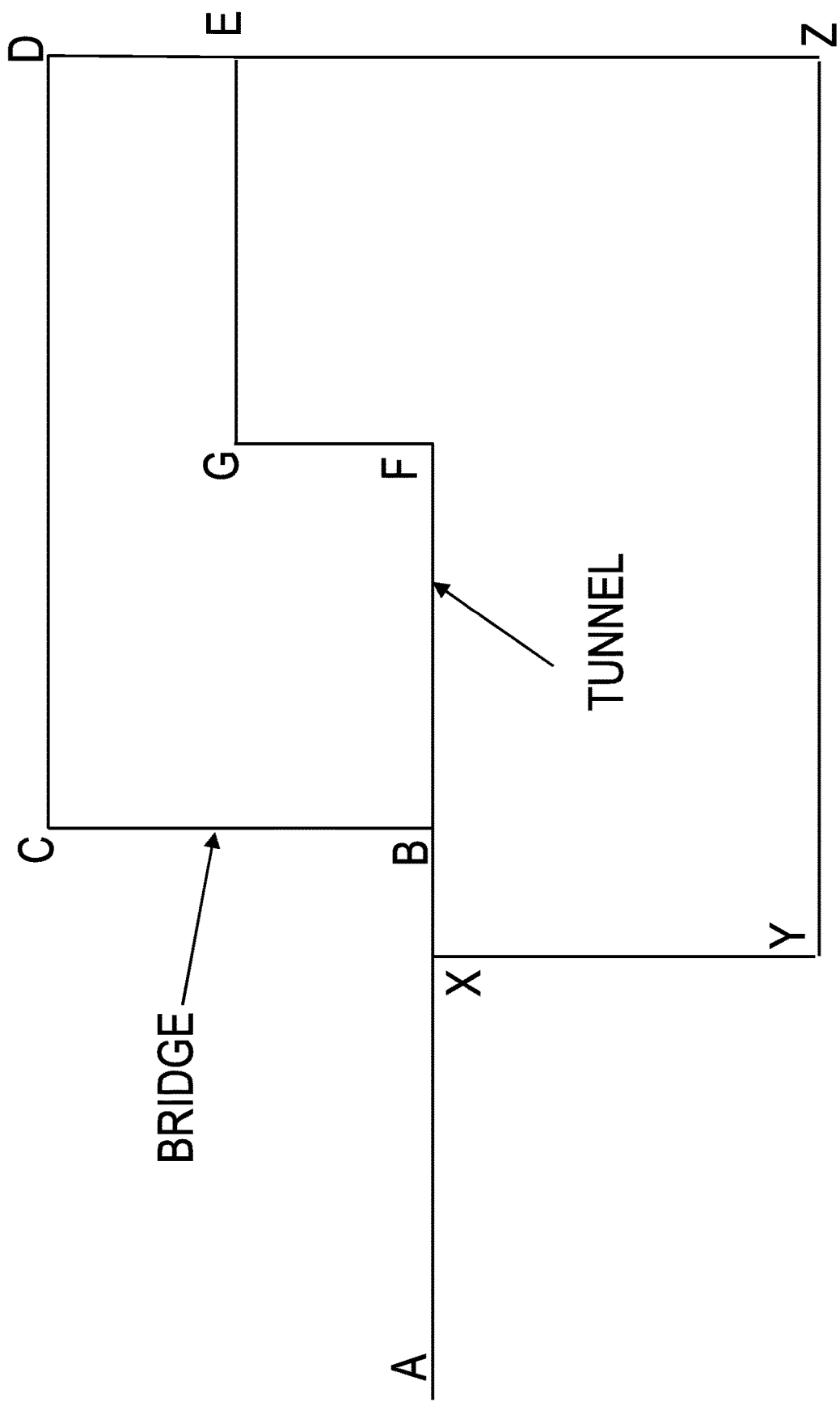

For example, in the scenario depicted in FIG. 18, a traveler usually travels from location A to destination E via route A-B-C-D-E. This route involves taking a bridge (on segment B-C), as shown in FIG. 18. If the current best route is A-B-C-D-E—a route with which the traveler is determined to be very familiar, the described technologies can be configured to instruct the user to "take your usual route" (e.g., in lieu of providing additional instructions as the traveler approaches each of points B, C, and D).

In another scenario, if the current best route as shown in FIG. 18 is A-B-F-G-E, a route the involves taking a tunnel (on segment B-F) instead of a bridge (on segment B-C), and the traveler is determined to be reasonably familiar with this route (e.g., above a defined familiarity threshold—e.g., a number of previous trips, a percentage of previous trips that have been traveled including this segment, etc.), the described technologies can be configured to instruct the traveler to "take the tunnel" or "take the tunnel instead of the bridge". This instruction can be delivered at the beginning of the trip and/or as the traveler approaches the deviation point between the routes A-B-C-D-E and A-B-F-G-E, in this case, point B as shown in FIG. 18. Additionally, in FIG. 18 the instruction to be given can be considered a "missing" instruction because the traveler needs to continue straight. Accordingly, in certain implementations, the referenced instruction can take the form "do not turn left to the bridge, continue straight to the tunnel instead").

Or, in another scenario, if the current best route is A-X-Y-Z-E (as shown in FIG. 18), an such a route is determined to be a route which the traveler is not familiar, the described technologies can provide turn-by-turn guidance as the user approaches each of points X, Y, and Z (and, "missing" instructions at points B, C and/or D, as appropriate for the traveler given the route topography and traveler's determined familiarities).

In certain implementations, in lieu of advising travelers of one or more individual actions to take (e.g., turn right in 300 m, transfer from bus to train at next station), the described technologies can be configured to instruct the user which route(s) to take (e.g., "take your usual route", "take the bridge, not the tunnel", "take the SR-520"). In certain implementations, the determination as to which route is optimal for a particular user at a particular time can be determined based on various metrics, such as least time, shortest distance etc. (as described herein). In certain implementations, the recommended route can be identified or conveyed to the traveler using a identifier or label (e.g., a name or phrase) provided by the user (e.g., "usual route", "alternate route to work #1") or one created based on the content of the route to be taken (e.g., "1-90 to 1-405") and/or how the route to be taken differs from the user's usual route to the same destination (e.g., "I-90", to differentiate between a route the includes 1-405 and 1-90 from one that includes 1-405 and SR-520).

In another implementation, traffic crashes and/or other incidents that are reported on roads (e.g., by crowdsourcing), are expanded to include the side of the road on which (or lane(s) in which) the crash took place (or in which immobile vehicles are blocking traffic). Doing so can assist drivers by alerting them to the lanes they should move into in order to pass the blockage and can also significantly improve routing systems such as those described herein (e.g., if the crash is known to have taken place in an unrestricted lane, vehicles eligible for the carpool lanes are likely to be significantly less-effected by the crash than vehicles that are not eligible for the carpool lanes, or, for example, if the crash took place in the right lane of a 6-lane road, a truck that is only allowed to travel in the two rights lanes is likely to be relatively more delayed by the crash than a passenger vehicle that is eligible to travel in all 6 lanes).

FIG. 7 is a flow diagram of a routine that illustrates aspects of one or more methods, such as those described in relation to one or more embodiments described herein. In various implementations, one or more aspects of the referenced method can be performed by one or more hardware devices/components (such as those depicted in FIG. 1), one or more software elements/components (such as those depicted in FIG. 1), and/or a combination of both. At 1410, one or more inputs (e.g., geographic coordinates) can be received. Such inputs can correspond to a mobility stoppage of a vehicle (e.g., to a location of the mobility stoppage of the vehicle). At 1420, the one or more inputs can be processed, e.g., to determine that the mobility stoppage of the vehicle is hazardous with respect to one or more other vehicles. In certain implementations, the location of the mobility stoppage of the vehicle can be compared with one or more defined vehicle stopping locations. In doing so, it can be determined that the location of the mobility stoppage does not correspond to the one or more defined vehicle stopping locations. Additionally, in certain implementations respective speeds of one or more vehicles determined to be within a defined proximity of the location of the mobility stoppage, can be determined. Based on the respective speeds of the one or more vehicles, it can be further determined that the mobility stoppage of the vehicle is hazardous with respect to the one or more other vehicles. At 1430, a hazard notification can be generated with respect to the vehicle, e.g., based on a determination that the mobility stoppage of the vehicle is hazardous with respect to one or more other vehicles. At 1440, the hazard notification can be transmitted to one or more devices, e.g., based on a determination that the mobility stoppage of the vehicle is hazardous with respect to one or more other vehicles. Additionally, in certain implementations the hazard notification can be transmitted to one or more devices determined to be associated with the one or more other vehicles with respect to which the mobility stoppage is determined to be hazardous. Additionally, in certain implementations the hazard notification can be transmitted to a navigation service.

By way of further illustration, in order to improve road safety, various navigation applications (e.g., running on mobile device or in-vehicle devices), enable users to report road hazards and/or report upcoming road hazards to their users (e.g. "Hazard reported ahead" with a screen visual showing how far ahead). When a vehicle becomes a hazard (e.g., stops in the road shoulder), the vehicle's driver (or passengers) may not be in a state of mind to report their vehicle as a hazard (i.e., self-report). Accordingly, the describe technologies can be configured to automatically report the vehicle as a hazard based on a determination that the vehicle is in fact a hazard. For example, in certain implementations, in a scenario in which a vehicle stops on a highway at a location that is determined not to be a rest stop (e.g., as determined from inputs originating at a GPS receiver of the device, V2V, V2I, etc., inputs, and/or a database of rest stops locations), a hazard can be auto-reported. In certain implementations, a vehicle stopping hazard may be distinguished from a vehicle stopping in traffic (e.g., not a hazard) by determining the speed of other vehicles on the road (i.e., crowdsourcing) from one or more speed-related inputs (e.g., inputs originating from GPS, in-vehicle speed sensors, etc.), and/or the lane the vehicle is in (e.g., from V2V, V2I, in-vehicle, mobile cameras or extra-vehicle cameras).

In certain implementation vehicles (whether non-autonomous, partially autonomous or fully-autonomous) can be configured to self-report themselves as hazards, e.g., to a central server/service which can make such information available to other users, devices, etc.

While some of the examples and illustrations provided herein may have been described with respect to a mobile device(s), it should be understood that many or all of them may be equally applicable to non-mobile, in-vehicle interfaces (e.g., infotainment systems, navigation systems, etc.) and vehicle-to-vehicle systems ("V2V") and vehicle-to-infrastructure systems ("V2I") as well.

It should also be noted that any or all instructions and/or notifications referenced herein can be delivered audibly and/or hapticly and/or visually.

Moreover, any/all of the referenced navigation applications and the improvements described herein can be implemented client-side (e.g., on a device such as a mobile device, on an in-vehicle device, on another type of device, etc.) and/or server-side (i.e., remotely) and/or in a combination of the two.

It should be noted that International PCT Application No. PCT/US2015/047054, filed Aug. 26, 2015, may be relevant to various aspects described herein, and is hereby incorporated by reference herein in its entirety.

At this juncture, it should be noted that although much of the foregoing description has been directed to systems and methods for determining user roles and/or devices usages within the context of vehicular travel, the systems and methods disclosed herein can be similarly deployed and/or implemented in scenarios, situations, and settings far beyond the referenced scenarios. It can be readily appreciated that the user-role determination system 100 can be effectively employed in practically any scenario where the determination and/or identification of a user or usage of a mobile device is of value, such as in the context of exercising or game playing. It should be further understood that any such implementation and/or deployment is within the scope of the systems and methods described herein.

It is to be understood that like numerals in the drawings represent like elements through the several figures, and that not all components and/or steps described and illustrated with reference to the figures are required for all embodiments or arrangements. It should also be understood that the embodiments and/or arrangements of the systems and methods disclosed herein can be incorporated as a software algorithm, application, program, module, or code residing in hardware, firmware and/or on a computer useable medium (including software modules and browser plug-ins) that can be executed in a processor of a computer system or a computing device to configure the processor and/or other elements to perform the functions and/or operations described below. It should be appreciated that according to at least one embodiment, one or more computer programs or applications that when executed perform methods described herein need not reside on a single computer or processor, but can be distributed in a modular fashion amongst a number of different computers or processors to implement various aspects of the systems and methods disclosed herein.

Thus, illustrative embodiments and arrangements of the present systems and methods provide a computer implemented method, computer system, and computer program product. The flowchart and block diagrams in the figures illustrate the architecture, functionality, and operation of possible implementations of systems, methods and computer program products according to various embodiments and arrangements. In this regard, each block in the flowchart or block diagrams can represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

It can therefore be appreciated that the described technologies are directed to and address specific technical challenges and longstanding deficiencies in multiple technical areas, including but not limited to context determination, navigation, and user interfaces. As described in detail herein, the disclosed technologies provide specific, technical solutions to the referenced technical challenges and unmet needs in the referenced technical fields and provide numerous advantages and improvements upon conventional approaches. Additionally, in various implementations one or more of the hardware elements, components, etc., referenced herein operate to enable, improve, and/or enhance the described technologies, such as in a manner described herein.

As used herein, the term "configured" encompasses its plain and ordinary meaning. In one example, a machine is configured to carry out a method by having software code for that method stored in a memory that is accessible to the processor(s) of the machine. The processor(s) access the memory to implement the method. In another example, the instructions for carrying out the method are hard-wired into the processor(s). In yet another example, a portion of the instructions are hard-wired, and a portion of the instructions are stored as software code in the memory.

It should also be noted that while the described techniques and technologies are described herein primarily with respect to navigation instruction and contextual determination, the described techniques/technologies are not so limited. Accordingly, the described techniques/technologies can be similarly implemented and/or employed in other settings and contexts and towards any number of additional objectives. Further technical advantages, solutions, and/or improvements (beyond those described and/or referenced herein) can be enabled as a result of such implementations.

It should also be understood that the components referenced herein can be combined together or separated into further components, according to a particular implementation. Additionally, in some implementations, various components of a particular device may run on separate machines.

Certain implementations are described herein as including logic or a number of components, modules, or mechanisms. Modules can constitute either software modules (e.g., code embodied on a machine-readable medium) or hardware modules. A "hardware module" is a tangible unit capable of performing certain operations and can be configured or arranged in a certain physical manner. In various example implementations, one or more computer systems (e.g., a standalone computer system, a client computer system, or a server computer system) or one or more hardware modules of a computer system (e.g., a processor or a group of processors) can be configured by software (e.g., an application or application portion) as a hardware module that operates to perform certain operations as described herein.

In some implementations, a hardware module can be implemented mechanically, electronically, or any suitable combination thereof. For example, a hardware module can include dedicated circuitry or logic that is permanently configured to perform certain operations. For example, a hardware module can be a special-purpose processor, such as a Field-Programmable Gate Array (FPGA) or an Application Specific Integrated Circuit (ASIC). A hardware module can also include programmable logic or circuitry that is temporarily configured by software to perform certain operations. For example, a hardware module can include software executed by a processor or other programmable processor. Once configured by such software, hardware modules become specific machines (or specific components of a machine) uniquely tailored to perform the configured functions. It will be appreciated that the decision to implement a hardware module mechanically, in dedicated and permanently configured circuitry, or in temporarily configured circuitry (e.g., configured by software) can be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering implementations in which hardware modules are temporarily configured (e.g., programmed), each of the hardware modules need not be configured or instantiated at any one instance in time. For example, where a hardware module comprises a processor configured by software to become a special-purpose processor, the processor can be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In implementations in which multiple hardware modules are configured or instantiated at different times, communications between such hardware modules can be achieved, for example, through the storage and retrieval of information in memory structures to which the multiple hardware modules have access. For example, one hardware module can perform an operation and store the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors can constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors can also operate to support performance of the relevant operations in a "cloud computing" environment or as a "software as a service" (SaaS). For example, at least some of the operations can be performed by a group of computers (as examples of machines including processors), with these operations being accessible via a network (e.g., the Internet) and via one or more appropriate interfaces (e.g., an API).

The performance of certain of the operations can be distributed among the processors, not only residing within a single machine, but deployed across a number of machines. In some example implementations, the processors or processor-implemented modules can be located in a single geographic location (e.g., within a home environment, an office environment, or a server farm). In other example implementations, the processors or processor-implemented modules can be distributed across a number of geographic locations.

The modules, methods, applications, and so forth described herein are implemented in some implementations in the context of a machine and an associated software architecture. The sections below describe representative software architecture(s) and machine (e.g., hardware) architecture(s) that are suitable for use with the disclosed implementations.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture can yield a smart device for use in the "internet of things," while yet another combination produces a server computer for use within a cloud computing architecture. Not all combinations of such software and hardware architectures are presented here, as those of skill in the art can readily understand how to implement the inventive subject matter in different contexts from the disclosure contained herein.

Figure 19:
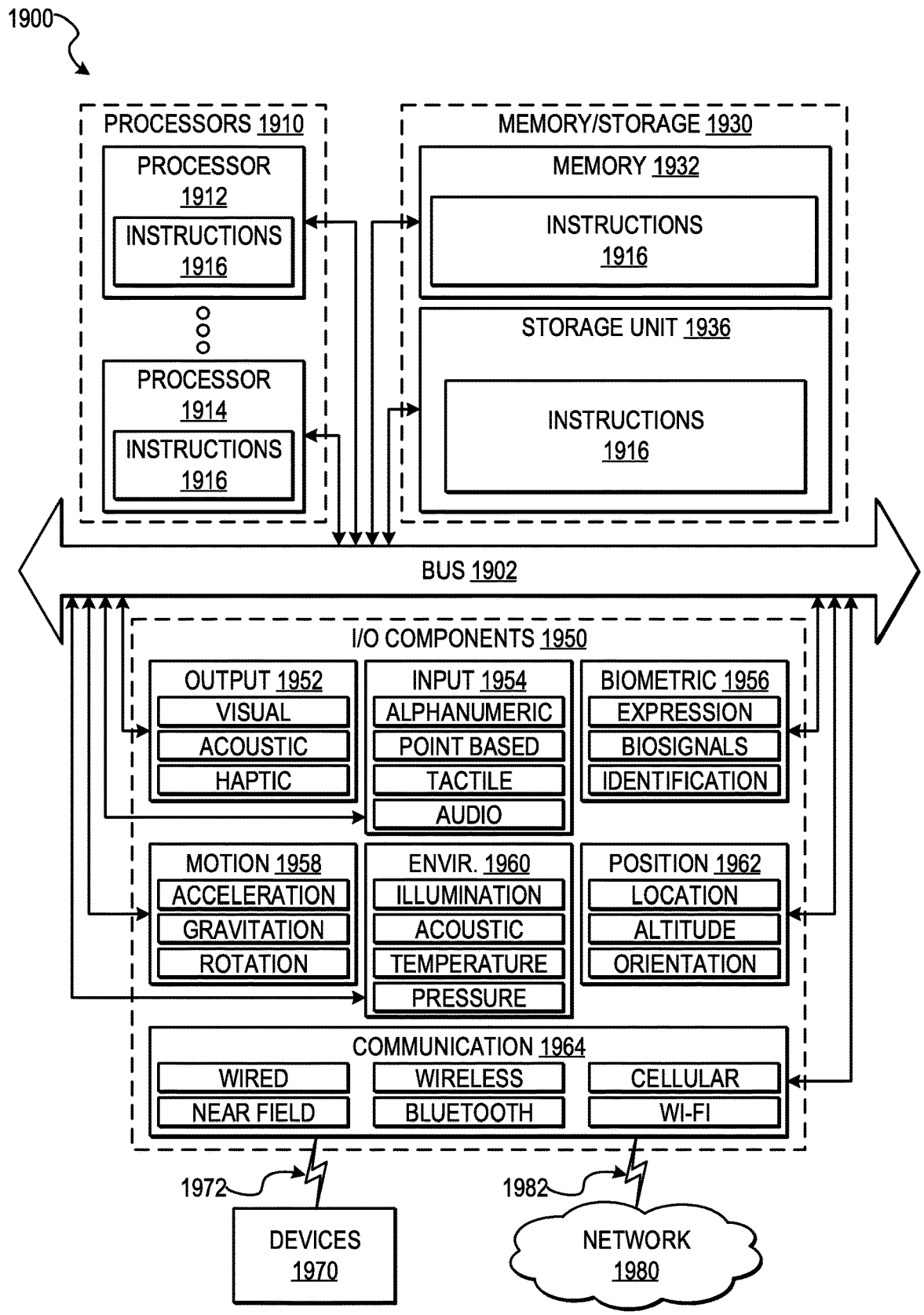
FIG. 19 is a block diagram illustrating components of a machine able to read instructions from a machine-readable medium and perform any of the methodologies discussed herein, according to an example embodiment.

FIG. 19 is a block diagram illustrating components of a machine 1900, according to some example implementations, able to read instructions from a machine-readable medium (e.g., a machine-readable storage medium) and perform any one or more of the methodologies discussed herein. Specifically, FIG. 19 shows a diagrammatic representation of the machine 1900 in the example form of a computer system, within which instructions 1916 (e.g., software, a program, an application, an applet, an app, or other executable code) for causing the machine 1900 to perform any one or more of the methodologies discussed herein can be executed. The instructions 1916 transform the machine into a particular machine programmed to carry out the described and illustrated functions in the manner described. In alternative implementations, the machine 1900 operates as a standalone device or can be coupled (e.g., networked) to other machines. In a networked deployment, the machine 1900 can operate in the capacity of a server machine or a client machine in a server-client network environment, or as a peer machine in a peer-to-peer (or distributed) network environment. The machine 1900 can comprise, but not be limited to, a server computer, a client computer, PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1916, sequentially or otherwise, that specify actions to be taken by the machine 1900. Further, while only a single machine 1900 is illustrated, the term "machine" shall also be taken to include a collection of machines 1900 that individually or jointly execute the instructions 1916 to perform any one or more of the methodologies discussed herein.

The machine 1900 can include processors 1910, memory/storage 1930, and I/O components 1950, which can be configured to communicate with each other such as via a bus 1902. In an example implementation, the processors 1910 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) can include, for example, a processor 1924 and a processor 1914 that can execute the instructions 1916. The term "processor" is intended to include multi-core processors that can comprise two or more independent processors (sometimes referred to as "cores") that can execute instructions contemporaneously. Although FIG. 19 shows multiple processors 1910, the machine 1900 can include a single processor with a single core, a single processor with multiple cores (e.g., a multi-core processor), multiple processors with a single core, multiple processors with multiples cores, or any combination thereof.

The memory/storage 1930 can include a memory 1932, such as a main memory, or other memory storage, and a storage unit 1936, both accessible to the processors 1910 such as via the bus 1902. The storage unit 1936 and memory 1932 store the instructions 1916 embodying any one or more of the methodologies or functions described herein. The instructions 1916 can also reside, completely or partially, within the memory 1932, within the storage unit 1936, within at least one of the processors 1910 (e.g., within the processor's cache memory), or any suitable combination thereof, during execution thereof by the machine 1900. Accordingly, the memory 1932, the storage unit 1936, and the memory of the processors 1910 are examples of machine-readable media.

As used herein, "machine-readable medium" means a device able to store instructions (e.g., instructions 1916) and data temporarily or permanently and can include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store the instructions 1916. The term "machine-readable medium" shall also be taken to include any medium, or combination of multiple media, that is capable of storing instructions (e.g., instructions 1916) for execution by a machine (e.g., machine 1900), such that the instructions, when executed by one or more processors of the machine (e.g., processors 1910), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1950 can include a wide variety of components to receive input, provide output, produce output, transmit information, exchange information, capture measurements, and so on. The specific I/O components 1950 that are included in a particular machine will depend on the type of machine. For example, portable machines such as mobile phones will likely include a touch input device or other such input mechanisms, while a headless server machine will likely not include such a touch input device. It will be appreciated that the I/O components 1950 can include many other components that are not shown in FIG. 19. The I/O components 1950 are grouped according to functionality merely for simplifying the following discussion and the grouping is in no way limiting. In various example implementations, the I/O components 1950 can include output components 1952 and input components 1954. The output components 1952 can include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1954 can include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example implementations, the I/O components 1950 can include biometric components 1956, motion components 1958, environmental components 1960, or position components 1962, among a wide array of other components. For example, the biometric components 1956 can include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1958 can include acceleration sensor components (e.g., accelerometer), gravitation sensor components, rotation sensor components (e.g., gyroscope), and so forth. The environmental components 1960 can include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that can provide indications, measurements, or signals corresponding to a surrounding physical environment. The position components 1962 can include location sensor components (e.g., a Global Position System (GPS) receiver component), altitude sensor components (e.g., altimeters or barometers that detect air pressure from which altitude can be derived), orientation sensor components (e.g., magnetometers), and the like.

Communication can be implemented using a wide variety of technologies. The I/O components 1950 can include communication components 1964 operable to couple the machine 1900 to a network 1980 or devices 1970 via a coupling 1982 and a coupling 1972, respectively. For example, the communication components 1964 can include a network interface component or other suitable device to interface with the network 1980. In further examples, the communication components 1964 can include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1970 can be another machine or any of a wide variety of peripheral devices (e.g., a peripheral device coupled via a USB).

Moreover, the communication components 1964 can detect identifiers or include components operable to detect identifiers. For example, the communication components 1964 can include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information can be derived via the communication components 1964, such as location via Internet Protocol (IP) geolocation, location via Wi-Fi® signal triangulation, location via detecting an NFC beacon signal that can indicate a particular location, and so forth.

In various example implementations, one or more portions of the network 1980 can be an ad hoc network, an intranet, an extranet, a virtual private network (VPN), a local area network (LAN), a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1980 or a portion of the network 1980 can include a wireless or cellular network and the coupling 1982 can be a Code Division Multiple Access (CDMA) connection, a Global System for Mobile communications (GSM) connection, or another type of cellular or wireless coupling. In this example, the coupling 1982 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1916 can be transmitted or received over the network 1980 using a transmission medium via a network interface device (e.g., a network interface component included in the communication components 1964) and utilizing any one of a number of well-known transfer protocols (e.g., HTTP). Similarly, the instructions 1916 can be transmitted or received using a transmission medium via the coupling 1972 (e.g., a peer-to-peer coupling) to the devices 1970. The term "transmission medium" shall be taken to include any intangible medium that is capable of storing, encoding, or carrying the instructions 1916 for execution by the machine 1900, and includes digital or analog communications signals or other intangible media to facilitate communication of such software.

Throughout this specification, plural instances can implement components, operations, or structures described as a single instance. Although individual operations of one or more methods are illustrated and described as separate operations, one or more of the individual operations can be performed concurrently, and nothing requires that the operations be performed in the order illustrated. Structures and functionality presented as separate components in example configurations can be implemented as a combined structure or component. Similarly, structures and functionality presented as a single component can be implemented as separate components. These and other variations, modifications, additions, and improvements fall within the scope of the subject matter herein.

Although an overview of the inventive subject matter has been described with reference to specific example implementations, various modifications and changes can be made to these implementations without departing from the broader scope of implementations of the present disclosure. Such implementations of the inventive subject matter can be referred to herein, individually or collectively, by the term "invention" merely for convenience and without intending to voluntarily limit the scope of this application to any single disclosure or inventive concept if more than one is, in fact, disclosed.

The implementations illustrated herein are described in sufficient detail to enable those skilled in the art to practice the teachings disclosed. Other implementations can be used and derived therefrom, such that structural and logical substitutions and changes can be made without departing from the scope of this disclosure. The Detailed Description, therefore, is not to be taken in a limiting sense, and the scope of various implementations is defined only by the appended claims, along with the full range of equivalents to which such claims are entitled.

As used herein, the term "or" can be construed in either an inclusive or exclusive sense. Moreover, plural instances can be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and can fall within a scope of various implementations of the present disclosure. In general, structures and functionality presented as separate resources in the example configurations can be implemented as a combined structure or resource. Similarly, structures and functionality presented as a single resource can be implemented as separate resources. These and other variations, modifications, additions, and improvements fall within a scope of implementations of the present disclosure as represented by the appended claims. The specification and drawings are, accordingly, to be regarded in an illustrative rather than a restrictive sense.

What is claimed is:

1. A system comprising:
a processing device; and
a memory coupled to the processing device and storing instructions that, when executed by the processing device, cause the system to perform operations comprising:
receiving a first input with respect to a device;
processing the first input to determine a navigation initiation instance with respect to the device;
identifying, based on the navigation initiation instance, a navigation destination;
identifying, based on the identified navigation destination, a navigation route associated with the device;
computing an alternative route based on a current location of the device and the identified navigation destination;
comparing the identified navigation route with the computed alternative route;
identifying the alternative route as preferable to the identified navigation route with respect to one or more criteria and above a defined threshold;
determining a degree of familiarity of a user with the alternative route;
generating one or more notifications based on the determined degree of familiarity; and
providing the one or more notifications via one or more interfaces of the device.

2. The system of claim 1, wherein receiving the first input comprises identifying a disconnection of a device from a network access point.

3. The system of claim 1, wherein the one or more notifications comprise one or more instructions that correspond to aspects of the alternative route.

4. The system of claim 1, wherein the one or more notifications comprise one or more instructions that correspond to aspects of the identified navigation route.

5. The system of claim 1, wherein the identified navigation route is associated with one or more identifiers.

6. The system of claim 1, wherein the alternative route is associated with one or more identifiers.

7. The system of claim 6, wherein the one or more identifiers correspond to one or more navigation operations included in the alternative route.

8. The system of claim 1, wherein the memory further stores instructions to cause the system to perform operations comprising:
prompting the user with respect to at least one of the navigation destination or the identified navigation route; and
receiving, in response to the prompting, an input from the user corresponding to the at least one of the navigation destination or the identified navigation route.

9. The system of claim 8, wherein providing the one or more notifications comprises providing the one or more notifications in relation to the input from the user.

10. A method comprising:
receiving a first input with respect to a device;
processing the first input to determine a navigation initiation instance with respect to the device;
identifying, based on the navigation initiation instance, a navigation destination;
identifying, based on the identified navigation destination, a navigation route associated with the device;
computing an alternative route based on a current location of the device and the identified navigation destination;
comparing the identified navigation route with the computed alternative route;
identifying the alternative route as preferable to the identified navigation route with respect to one or more criteria and above a defined threshold;
determining a degree of familiarity of a user with the alternative route;
generating one or more notifications based on the determined degree of familiarity; and
providing the one or more notifications via one or more interfaces of the device.

11. The method of claim 10, wherein receiving the first input comprises identifying a disconnection of a device from a network access point.

12. The method of claim 10, wherein the one or more notifications comprise one or more instructions that correspond to aspects of the alternative route.

13. The method of claim 10, wherein the one or more notifications comprise one or more instructions that correspond to aspects of the identified navigation route.

14. The method of claim 10, wherein the identified navigation route is associated with one or more identifiers.

15. The method of claim 10, wherein the alternative route is associated with one or more identifiers.

16. The system of claim 6, wherein the one or more identifiers correspond to one or more navigation operations included in the alternative route.

17. The method of claim 10, further comprising:
prompting the user with respect to at least one of the navigation destination or the identified navigation route; and
receiving, in response to the prompting, an input from the user corresponding to the at least one of the navigation destination or the identified navigation route.

18. The system of claim 8, wherein providing the one or more notifications comprises providing the one or more notifications in relation to the input from the user.

19. A non-transitory computer readable medium having instructions stored thereon that, when executed by a processing device, cause the processing device to perform operations comprising:
receiving a first input with respect to a device;
processing the first input to determine a navigation initiation instance with respect to the device;
identifying, based on the navigation initiation instance, a navigation destination;
identifying, based on the identified navigation destination, a navigation route associated with the device;
prompting the user with respect to at least one of the navigation destination or the identified navigation route;
receiving, in response to the prompting, an input from the user corresponding to the at least one of the navigation destination or the identified navigation route;
computing an alternative route based on a current location of the device and the identified navigation destination;
comparing the identified navigation route with the computed alternative route;
identifying the alternative route as preferable to the identified navigation route with respect to one or more criteria and above a defined threshold;
determining a degree of familiarity of a user with the alternative route;
generating one or more notifications based on the determined degree of familiarity; and
providing the one or more notifications via one or more interfaces of the device and in relation to the input from the user.

20. The computer-readable medium of claim 19, wherein receiving the first input comprises identifying a disconnection of a device from a network access point.

* * * * *